(12) United States Patent
Iwasaki et al.

(10) Patent No.: US 7,976,104 B2
(45) Date of Patent: Jul. 12, 2011

(54) SEAT AND SEAT CONTROL METHOD

(75) Inventors: Keita Iwasaki, Toyota (JP); Teiji Mabuchi, Miyoshi (JP); Osamu Fujimoto, Nissin (JP); Makoto Ito, Miyoshi (JP); Yoshihiro Ooishi, Kariya (JP)

(73) Assignees: Toyota Jidosha Kabushiki Kaisha, Toyota-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/992,471

(22) PCT Filed: May 25, 2009

(86) PCT No.: PCT/IB2009/005695
§ 371 (c)(1),
(2), (4) Date: Nov. 12, 2010

(87) PCT Pub. No.: WO2009/150502
PCT Pub. Date: Dec. 17, 2009

(65) Prior Publication Data
US 2011/0074198 A1 Mar. 31, 2011

(30) Foreign Application Priority Data
Jun. 9, 2008 (JP) ................. 2008-150769

(51) Int. Cl.
*B60N 2/44* (2006.01)
(52) U.S. Cl. .................................. 297/463.1
(58) Field of Classification Search .......... 297/341, 297/463.1; 74/488, 489, 501.6, 502.2, 512, 74/513, 514, 528, 529, 560
See application file for complete search history.

(56) References Cited

U.S. PATENT DOCUMENTS

| | | | |
|---|---|---|---|
| 6,848,745 B1 * | 2/2005 | Tsuge | 297/367 R |
| 7,293,838 B2 * | 11/2007 | Sugama et al. | 297/378.1 |
| 7,862,121 B2 * | 1/2011 | Ishijima et al. | 297/367 R |
| 2003/0122412 A1 * | 7/2003 | Niimi et al. | 297/341 |
| 2007/0063565 A1 * | 3/2007 | Habedank et al. | 297/341 |

FOREIGN PATENT DOCUMENTS

| | | |
|---|---|---|
| DE | 100 15 772 | 6/2001 |
| JP | 6 49159 | 7/1994 |
| JP | 8 26007 | 1/1996 |

OTHER PUBLICATIONS

International Search Report issued Sep. 10, 2009 in PCT/IB09/05695 filed May 25, 2009.

* cited by examiner

*Primary Examiner* — David Dunn
*Assistant Examiner* — Philip Gabler
(74) *Attorney, Agent, or Firm* — Oblon, Spivak, McClelland, Maier & Neustadt, L.L.P.

(57) ABSTRACT

A seat includes a seat main body; first and second adjustable portions, each of which is provided on the seat main body and is placed in an adjustable state by operating force; an operating member which is displaced in a predetermined range; a first operating force transmitting portion for transmitting the operating force of the operating member to the first adjustable portion when the operating member is displaced in a first range; a second operating force transmitting portion for transmitting the operating force of the operating member to the second adjustable portion when the operating member is displaced in a second range; and an operation reaction force avoiding portion for keeping the first adjustable portion in the state that it is in when the operating member is displaced in the first range, when the operating member is displaced in the second range, by the input operating force.

8 Claims, 20 Drawing Sheets

SEAT AND SEAT CONTROL METHOD

BACKGROUND OF THE INVENTION

1. Field of the Invention

The invention relates to a seat provided in an automobile or the like for seating an occupant, for example, and a seat control method.

2. Description of the Related Art

Japanese Patent Application Publication No. 8-26007 (JP-A-8-26007) and Japanese Utility Model Application Publication No. 6-49159 (JP-U-6-49159), for example, describe known seats for a vehicle. JP-A-8-26007 describes a seat in which a locking device that controls the tilt angle of a backrest of the seat is unlocked by the first stage of an operation of a reclining lever, and the locking device that controls the height of the seat is unlocked by the second stage of the operation of the reclining lever.

However, with the seat described in JP-A-8-26007, both the operation reaction force of the locking device that controls the tilt angle of the backrest of the seat and the operation reaction force of the locking device that controls the height of the seat act on the reclining lever. Therefore, the operation reaction force that acts on the reclining lever increases during the second stage of the operation of the reclining lever, and as a result, operability of a plurality of locking devices suffers.

SUMMARY OF THE INVENTION

This invention thus provides a seat and a seat control method that improves the operability, of a plurality of adjustable portions.

A first aspect of the invention relates to a seat that includes a seat main body for seating an occupant; a first adjustable portion and a second adjustable portion, each of which is provided on the seat main body and is placed in an adjustable state by operating force that is transmitted or is adjusted by operating force that is transmitted; an operating member which is displaced in a predetermined range by operating force input from an operation performed by an operator; a first operating force transmitting portion for transmitting the operating force of the operating member to the first adjustable portion when the operating member is displaced in a first range within the predetermined range by the input operating force; a second operating force transmitting portion for transmitting the operating force of the operating member to the second adjustable portion when the operating member is displaced in a range that at least includes a second range that differs from the first range within the predetermined range by the input operating force; and an operation reaction force avoiding portion for avoiding an increase in operation reaction force transmitted from the first adjustable portion to the operating member by keeping the first adjustable portion in the state that the first adjustable portion is in when the operating member is displaced in the first range, when the operating member is displaced in the second range after having been displaced in the first range, by the input operating force.

With the seat according to this first aspect of the invention, when the operating member is displaced in a first range within the predetermined range by the input operating force, the operating force of the operating member is transmitted to the first adjustable portion via the first operating force transmitting portion. This operating force places the first adjustable portion in an adjustable state or adjusts the first adjustable portion. Also, when the operating member is displaced in a range that at least includes a second range that differs from the first range within the predetermined range by the input operating force, the operating force of the operating member is transmitted to the second adjustable portion via the second operating force transmitting portion. This operating force places the second adjustable portion in an adjustable state or adjusts the second adjustable portion.

With this seat, when the operating member is displaced in the second range after having been displaced in the first range, the first adjustable portion is kept in the state that it is in when the operating member is displaced in the first range (i.e., in an adjustable state or an adjusted state) by the operation reaction force avoiding portion. As a result, the operation reaction force transmitted from the first adjustable portion to the operating member is able to be kept from increasing.

With the seat according to the first example embodiment of the invention, when the operating member is displaced in the second range, which is the second stage, the operation reaction force transmitted from the first adjustable portion to the operating member is prevented from increasing. As a result, the operability of a plurality of adjustable portions can be improved compared with a case in which the operation reaction force from the first adjustable portion increases when the operating member is displaced in the second range.

In the seat described above, the second operating force transmitting portion may be formed to interrupt the transmission of operating force from the operating member to the second adjustable portion when the operating member is displaced in the first range by the input operating force, and transmit the operating force of the operating member to the second adjustable portion when the operating member is displaced in the second range by the input operating force.

With this kind of seat, when the operating member is displaced in the first range by the input operating force, the first operating force transmitting portion transmits operating force from the operating member to the first adjustable portion, but the second operating force transmitting portion interrupts the transmission of operating force from the operating member to the second adjusting portion. Accordingly, the first adjustable portion can be placed in an adjustable state or can be adjusted, while the second adjustable portion can be kept in its initial state. On the other hand, when the operating member is displaced in the second range after having been displaced in the first range, the operation reaction force avoiding portion keeps the operation reaction force transmitted from the first adjustable portion to the operating member from increasing, while the second operating force transmitting portion transmits operating force from the operating member to the second adjustable portion. As a result, the second adjustable portion can be placed in an adjustable state or can be adjusted, while the first adjustable portion is kept in the state that it is in when the operating member is displaced in the first range.

According to this seat, the timings at which the first adjustable portion and the second adjustable portion are operated by a single operation of the operating member are different.

The seat may also include a transmitting member which is formed with an engaging portion and which is able to transmit operating force to the first adjustable portion and is displaceably provided with respect to the seat main body. Also, the first operating force transmitting portion and the operation reaction force avoiding portion may be continuous and integrally formed with the operating member, and together may form an engaged portion that engages with the engaging portion such that operating force of the operating member can be transmitted.

According to this seat, the first operating force transmitting portion and the operation reaction force avoiding portion are continuous and integrally formed with the operating member.

As a result, the operability of the plurality of adjustable portions can be improved with a simple structure while suppressing an increase in the number of parts.

In the seat described above, the engaged portion may be an elongated hole in the operating member into which the engaging portion is movably inserted and with which the engaging portion is engaged.

With this seat, a simple structure is employed wherein the elongated hole which serves as the engaged portion into which the engaging portion is movably inserted and with which the engaging portion is engaged is formed in the operating member. As a result, the cost is reduced.

With the seat described above, the engaged portion may be a contoured portion of the operating member against which the engaging portion is movably abutted and with which the engaging portion is engaged.

With this seat, a simple structure is employed wherein the contoured portion which serves as the engaged portion against which the engaging portion is movably abutted and with which the engaging portion is engaged is formed in the operating member. As a result, the cost is reduced.

The seat may also include a pivoting portion for enabling the operating member to pivot freely. Also, the contoured portion of the engaged portion may include a first circular-arc portion having a predetermined curvature and a second circular-arc portion formed in a circular-arc shape that is concentric with the pivoting portion.

With the seat described above, the operating member and the transmitting member may each be pivotally provided on the seat main body, and a portion of the engaged portion that is formed by the operation reaction force avoiding portion may be formed in a circular-arc shape that is concentric with the pivoting portion of the operating member.

According to this seat, a portion of the engaged portion that is formed by the operation reaction force avoiding portion may be formed in a circular-arc shape that is concentric with the pivoting portion of the operating member. Therefore, operating force is inhibited from being transmitted from the operating member to the transmitting member when the engaging portion moves the portion of the engaged portion that is formed by the operation reaction force avoiding portion, so the transmitting member can be kept at a fixed pivot angle. As a result, the first adjustable portion can be kept in the state that it is in when the operating member is displaced in the first range.

With the seat described above, the operating member and the transmitting member may each be pivotally provided on the seat main body, and a portion of the engaged portion that is formed by the operation reaction force avoiding portion may be formed in a straight shape extending in a direction parallel with the tangential direction of the transmitting member.

According to this seat, a portion of the engaged portion that is formed by the operation reaction force avoiding portion is formed in a straight shape extending in a direction parallel with the tangential direction of the transmitting member. Therefore, operating force is inhibited from being transmitted from the operating member to the transmitting member when the engaging portion moves the portion of the engaged portion that is formed by the operation reaction force avoiding portion, so the transmitting member can be kept at a fixed pivot angle. As a result, the first adjustable portion can be kept in the state that it is in when the operating member is displaced in the first range.

With the seat described above, the first adjustable portion and the second adjustable portion may be a combination of at least two from among i) a longitudinal sliding position adjusting mechanism for adjusting the sliding position of the seat main body in the longitudinal direction, ii) a rotational position adjusting mechanism for adjusting the position of the seat main body in the rotational direction, and iii) a lateral sliding position adjusting mechanism for adjusting the sliding position of the seat main body in the lateral direction.

According to this seat, it is possible to improve the operability of a plurality of adjustable portions which are a combination of at least two from among the longitudinal sliding position adjusting mechanism, the rotational position adjusting mechanism, and the lateral sliding position adjusting mechanism.

With the seat described above, at least one of the first adjustable portion or the second adjustable portion may be a height position adjusting mechanism for adjusting the position of the seat main body in the vertical direction.

A second aspect of the invention relates to a seat. This seat includes a seat main body for seating an occupant; a first adjustable portion and a second adjustable portion, each of which is provided on the seat main body and is placed in an adjustable state by operating force that is transmitted or is adjusted by operating force that is transmitted; an operating member which is displaced in a predetermined range by operating force input from an operation performed by an operator; a first operating force transmitting portion for transmitting the operating force of the operating member to the first adjustable portion when the operating member is displaced in a first range within the predetermined range by the input operating force; a second operating force transmitting portion for transmitting the operating force of the operating member to the second adjustable portion when the operating member is displaced in a range that at least includes a second range that differs from the first range within the predetermined range by the input operating force; and an operation reaction force avoiding portion for inhibiting an increase in operation reaction force transmitted from the first adjustable portion to the operating member by reducing the amount of movement of the first adjustable portion per amount of displacement of the operating member when the operating member is displaced in the second range after having been displaced in the first range, by the input operating force, compared to when the operating member is displaced in the first range.

A third aspect of the invention relates to a control method for a seat. This control method for a seat relates to a seat that includes a seat main body for seating an occupant, a first adjustable portion and a second adjustable portion, each of which is provided on the seat main body and is placed in an adjustable state by operating force that is transmitted or is adjusted by operating force that is transmitted, and an operating member which is displaced in a predetermined range by operating force input from an operation performed by an operator. The control method includes transmitting the operating force of the operating member to the first adjustable portion when the operating member is displaced in a first range within the predetermined range by the input operating force; transmitting the operating force of the operating member to the second adjustable portion when the operating member is displaced in a range that at least includes a second range that differs from the first range within the predetermined range by the input operating force; and keeping the first adjustable portion in the state that the first adjustable portion is in when the operating member is displaced in the first range, when the operating member is displaced in the second range after having been displaced in the first range, by the input operating force.

A fourth aspect of the invention relates to a control method for a seat. This control method for a seat relates to a seat that includes a seat main body for seating an occupant, a first adjustable portion and a second adjustable portion, each of which is provided on the seat main body and is placed in an adjustable state by operating force that is transmitted or is adjusted by operating force that is transmitted, and an operating member which is displaced in a predetermined range by operating force input from an operation performed by an operator. The control method includes transmitting the operating force of the operating member to the first adjustable portion when the operating member is displaced in a first range within the predetermined range by the input operating force; transmitting the operating force of the operating member to the second adjustable portion when the operating member is displaced in a range that at least includes a second range that differs from the first range within the predetermined range by the input operating force; and reducing the amount of movement of the first adjustable portion per amount of displacement of the operating member when the operating member is displaced in the second range after having been displaced in the first range, by the input operating force, compared to when the operating member is displaced in the first range.

In this way, the seat and seat control method according to these aspects of the invention improve the operability of a plurality of adjustable portions.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
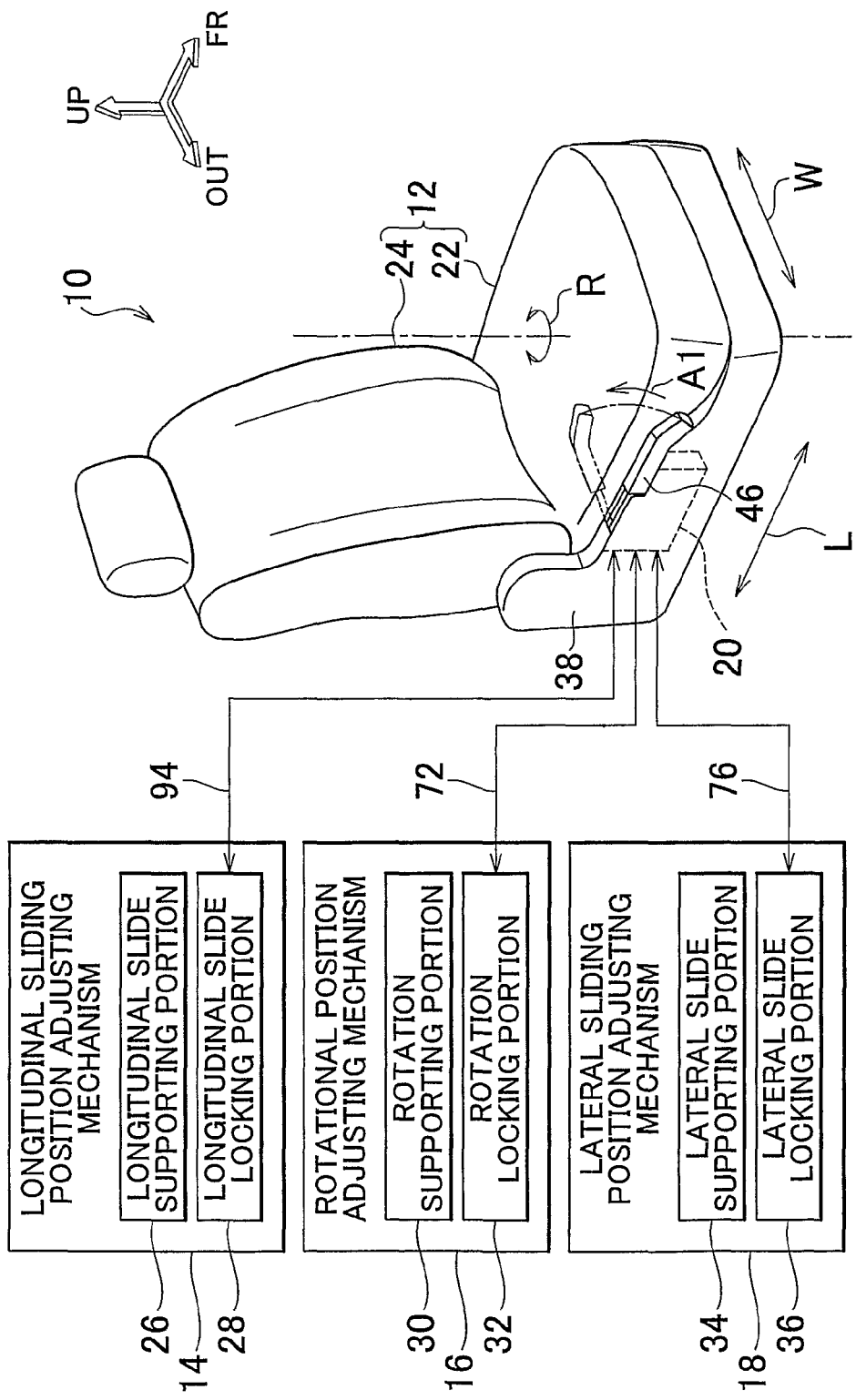
FIG. 1 is a view of the overall structure of a seat according to a first example embodiment of the invention.

FIG. 1 is a view of the overall structure of a seat 10 according to a first example embodiment of the invention. Incidentally, in the drawings and the following description, arrow UP indicates an upward direction in the vertical direction of the vehicle with respect to the seat 10, arrow FR indicates a forward direction in the longitudinal direction of the vehicle with respect to the seat 10, and arrow OUT indicates an outward direction in the width direction of the vehicle with respect to the seat 10.

The seat 10 according to the first example embodiment of the invention shown in FIG. 1 is used as a seat in a second row of seats in a vehicle such as a minivan in which there are three rows of seats in the longitudinal direction of the vehicle, for example. The structure of the seat 10 is as described below.

That is, the seat 10 includes a seat main body 12, a longitudinal sliding position adjusting mechanism 14, a rotational position adjusting mechanism 16, a lateral sliding position adjusting mechanism 18, and an unlocking mechanism 20. The seat main body 12 has a seat cushion 22 and a seatback 24, and enables an occupant to be seated.

The longitudinal sliding position adjusting mechanism 14 is a mechanism that has a longitudinal slide supporting portion 26 and a longitudinal slide locking portion 28. The longitudinal slide supporting portion 26 slidably supports the seat main body 12 in the longitudinal direction of the vehicle (i.e., the direction of arrow L in FIG. 1) with respect to the vehicle body. The longitudinal slide locking portion 28 can be switched between a locked state in which the longitudinal slide supporting portion 26 is unable to be adjusted, and an unlocked state in which the longitudinal slide supporting portion 26 is able to be adjusted.

The rotational position adjusting mechanism 16 is a mechanism that has a rotation supporting portion 30 and a rotation locking portion 32. The rotation supporting portion 30 rotatably supports the seat main body 12 in the direction of arrow R in FIG. 1 with respect to the vehicle body, with the center portion of a seat cushion 22 when viewed from above as the center of rotation. The rotation locking portion 32 can be switched between a locked state in which the rotation supporting portion 30 is unable to be adjusted, and an unlocked state in which the rotation supporting portion 30 is able to be adjusted.

The lateral sliding position adjusting mechanism 18 includes a lateral slide supporting portion 34 and a lateral slide locking portion 36. The lateral slide supporting portion 34 slidably supports the seat main body 12 in the width direction of the vehicle (i.e., the direction of arrow W in FIG. 1) with respect to the vehicle body. The lateral slide locking portion 36 can be switched between a locked state in which the lateral slide supporting portion 34 is unable to be adjusted, and an unlocked state in which the lateral slide supporting portion 34 is able to be adjusted.

Incidentally, the longitudinal slide locking portion 28, the rotation locking portion 32, and the lateral slide locking portion 36 described above are all configured so as to be urged toward the locked side by urging members such as springs or the like, not shown, so as to be kept locked when no operating force is being transmitted from an operating lever 46 side.

The unlocking mechanism 20 serves to unlock the longitudinal slide locking portion 28, the rotation locking portion 32, and the lateral slide locking portion 36, and is provided inside a cover member 38 that is provided to the side of the seat cushion 22.

Figure 2:
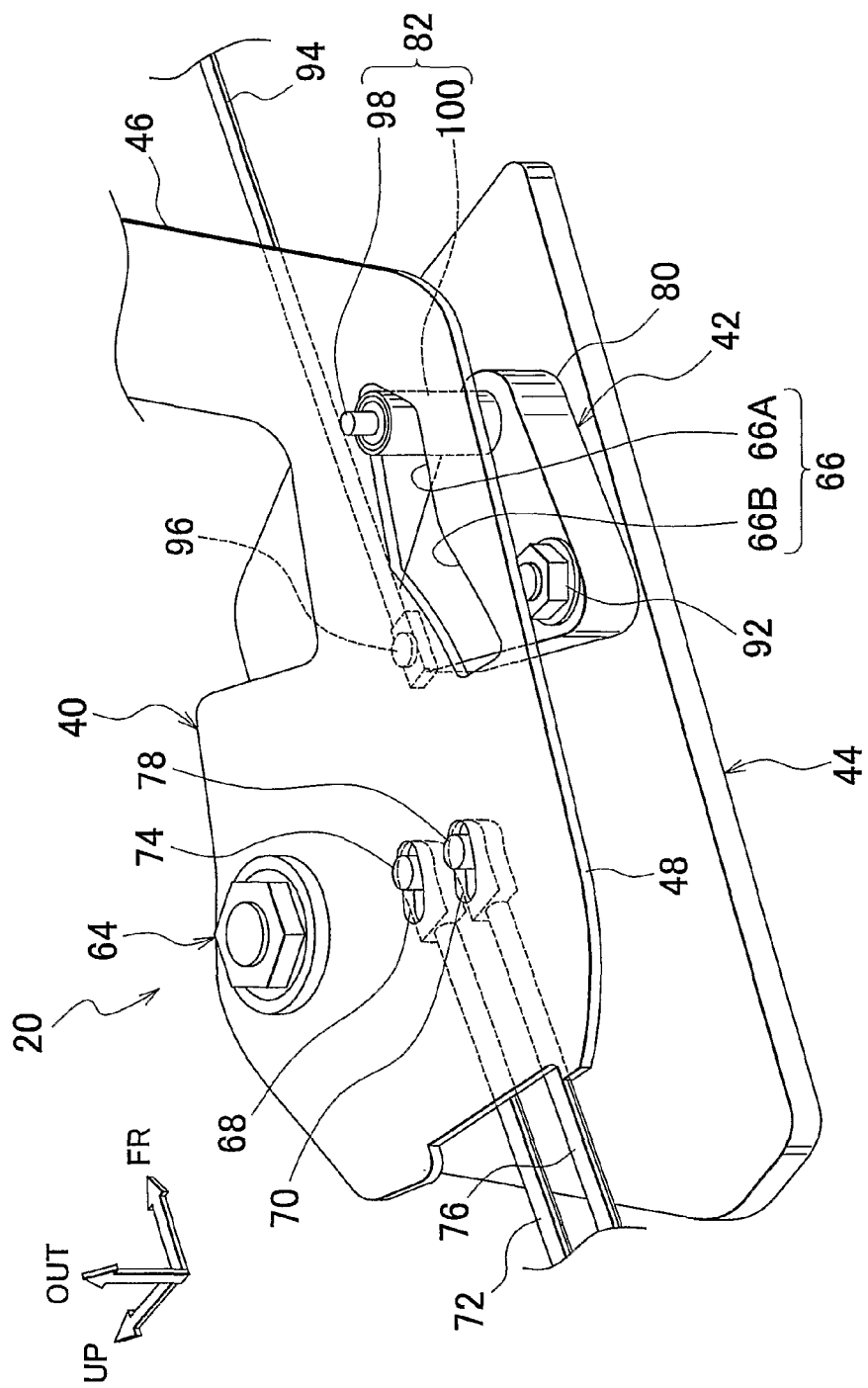
FIG. 2 is a perspective view of an unlocking mechanism in the first example embodiment of the invention.
Figure 3:
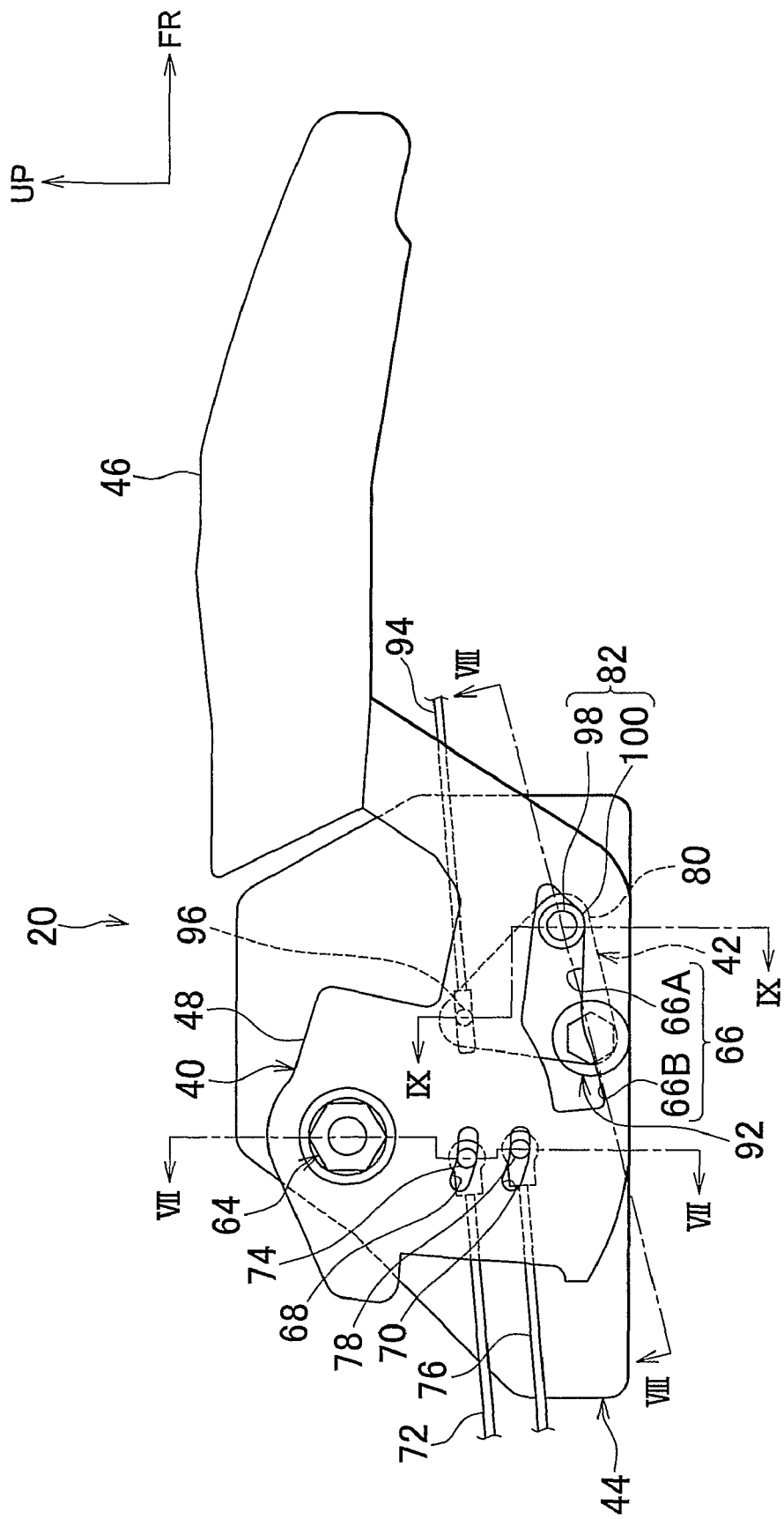
FIG. 3 is a side view of the unlocking mechanism in the first example embodiment of the invention.
Figure 4:
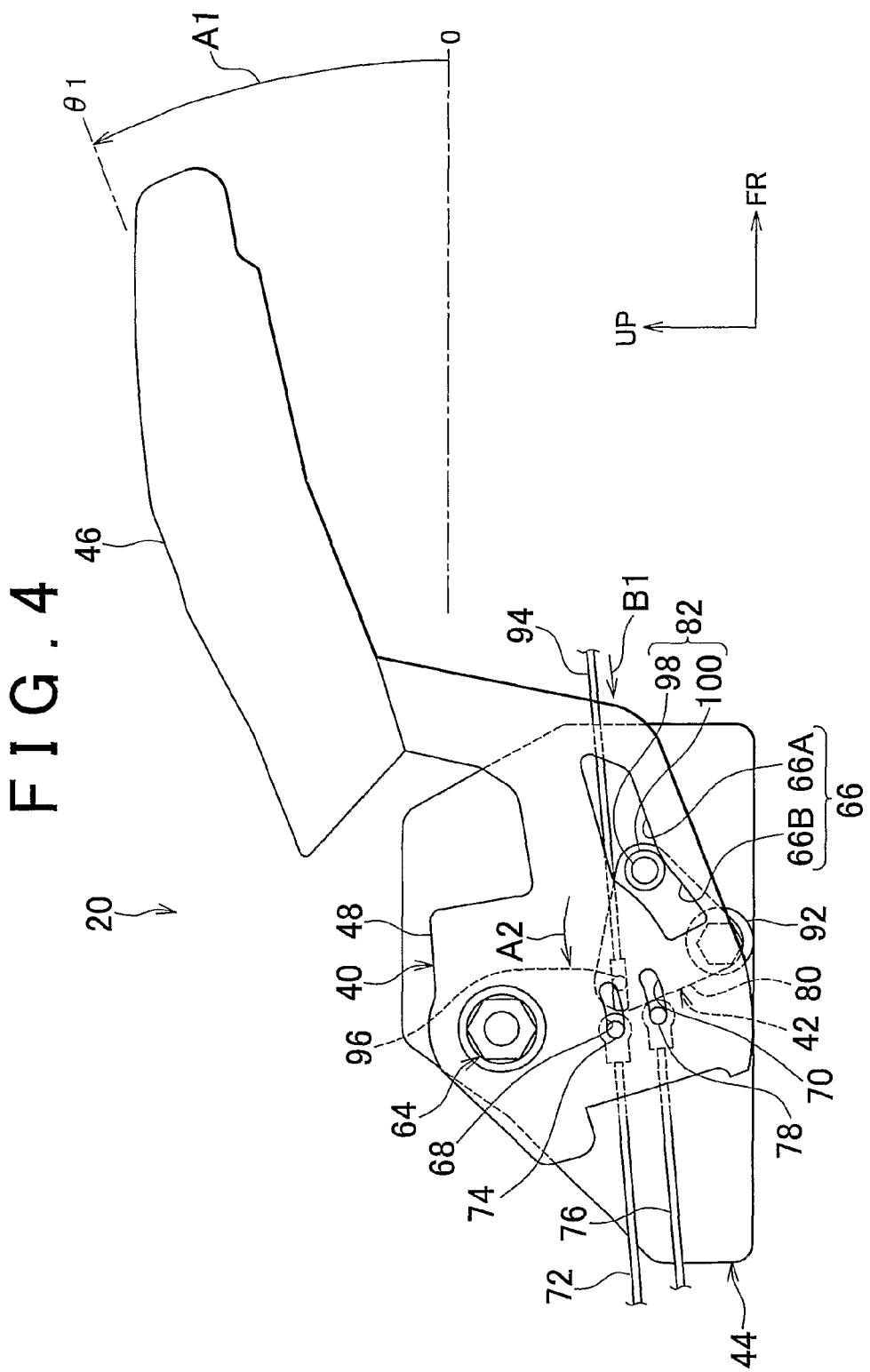
FIG. 4 is an operational diagram of the unlocking mechanism shown in FIG. 3.
Figure 5:
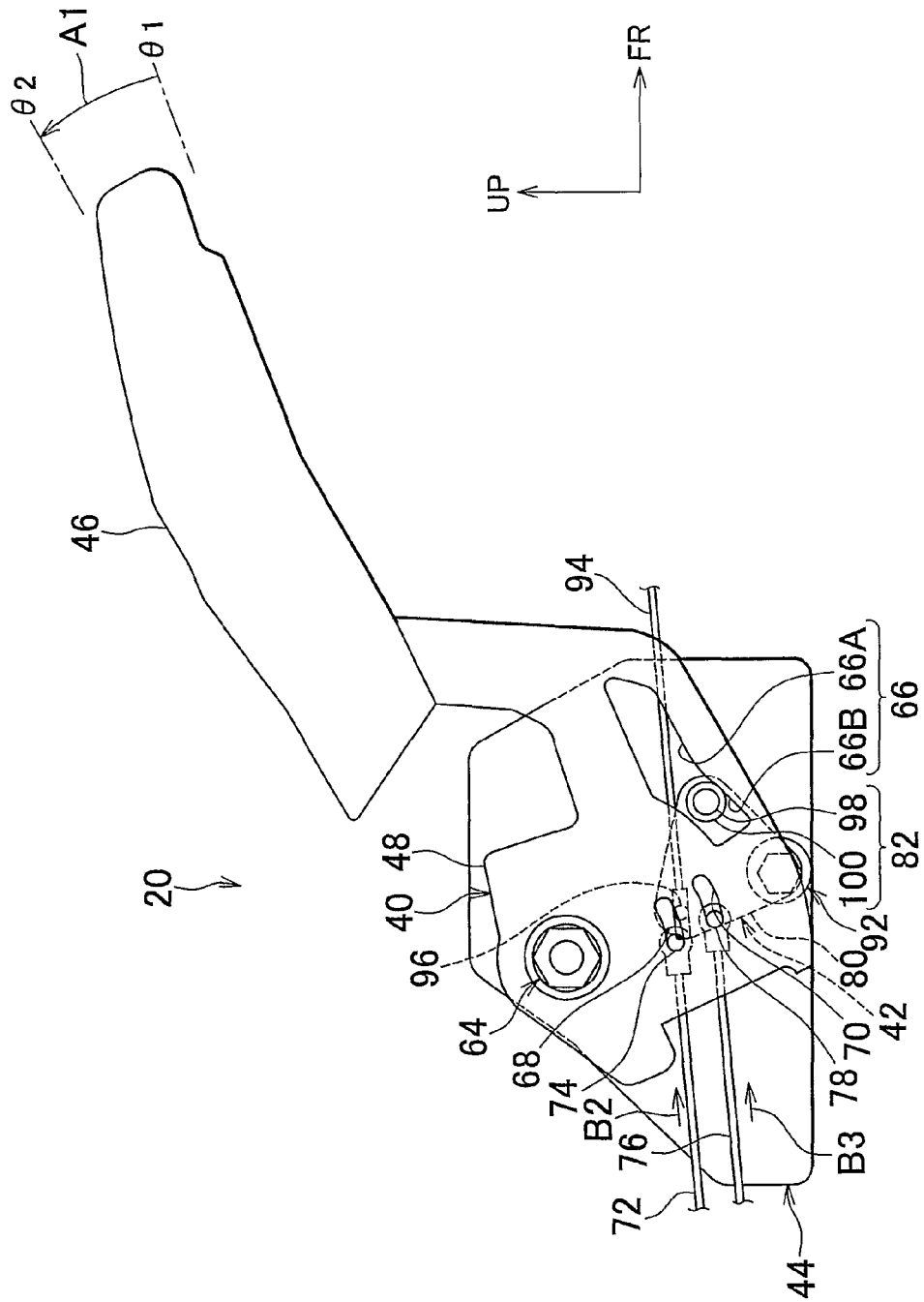
FIG. 5 is another operational diagram of the unlocking mechanism shown in FIG. 3.
Figure 6:
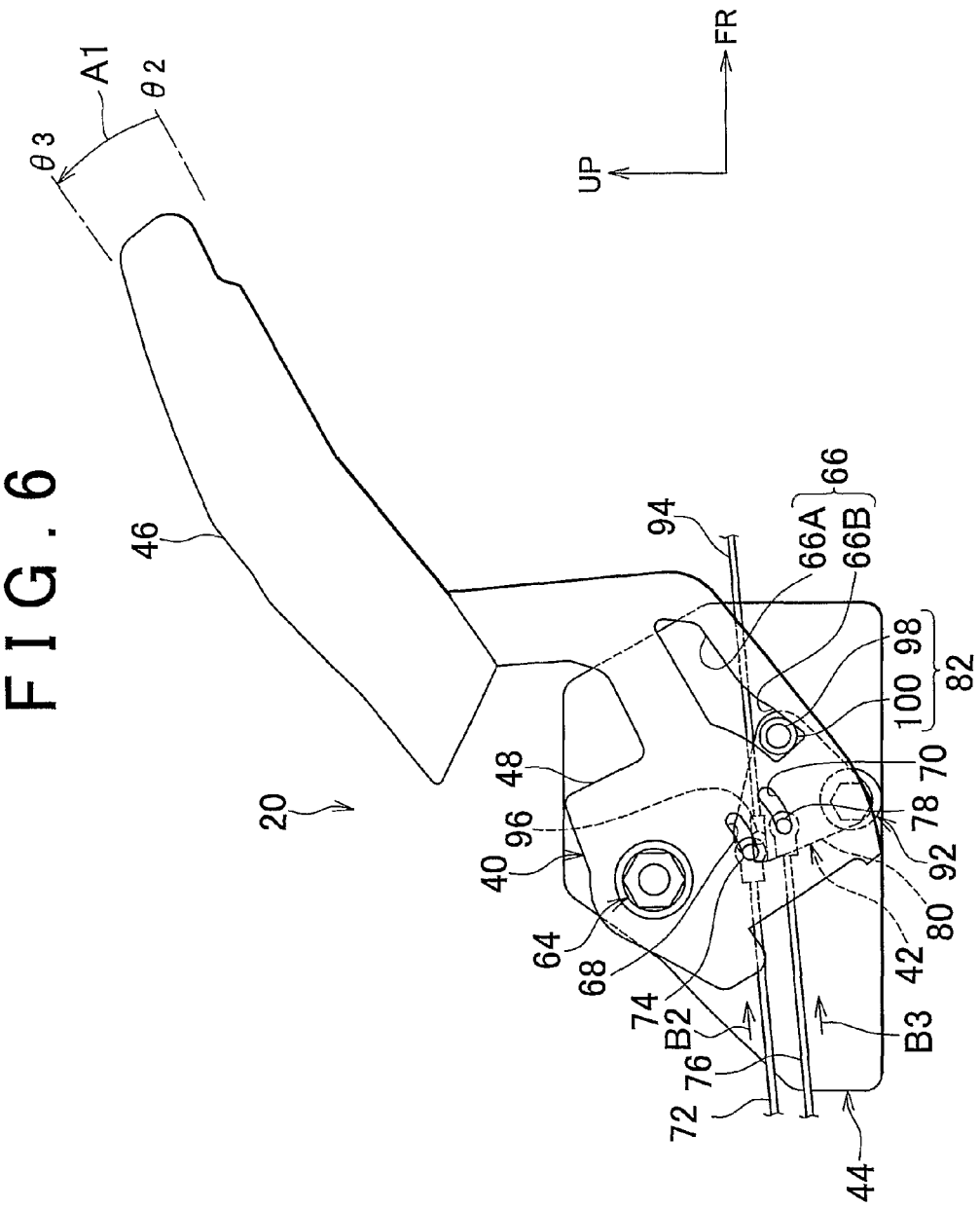
FIG. 6 is still another operational diagram of the unlocking mechanism shown in FIG. 3.
Figure 7:
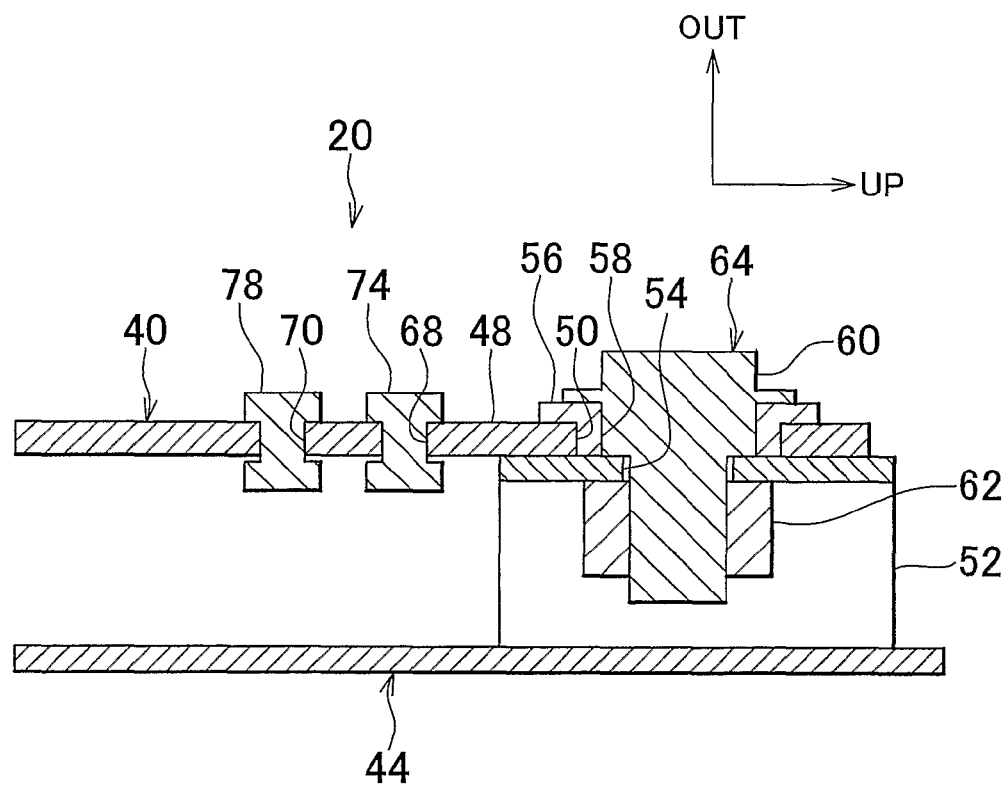
FIG. 7 is a sectional view taken along line VII-VII in FIG. 3.
Figure 8:
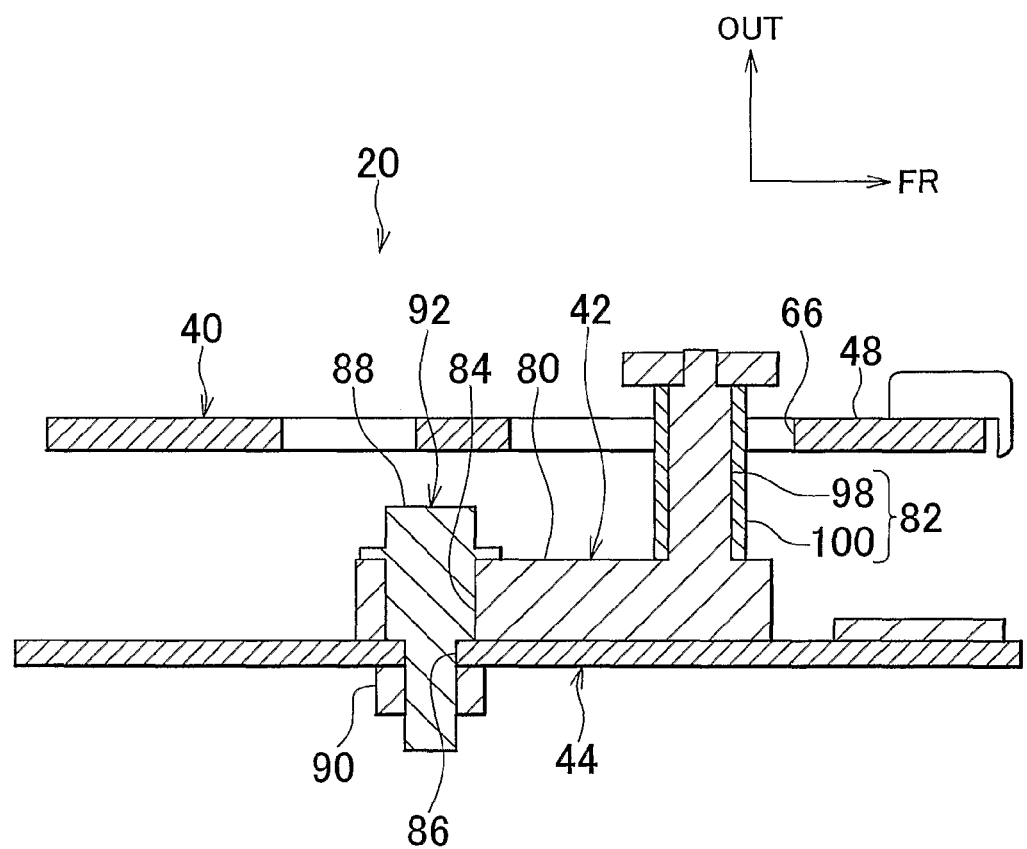
FIG. 8 is a sectional view taken along line VIII-VIII in FIG. 3.
Figure 9:
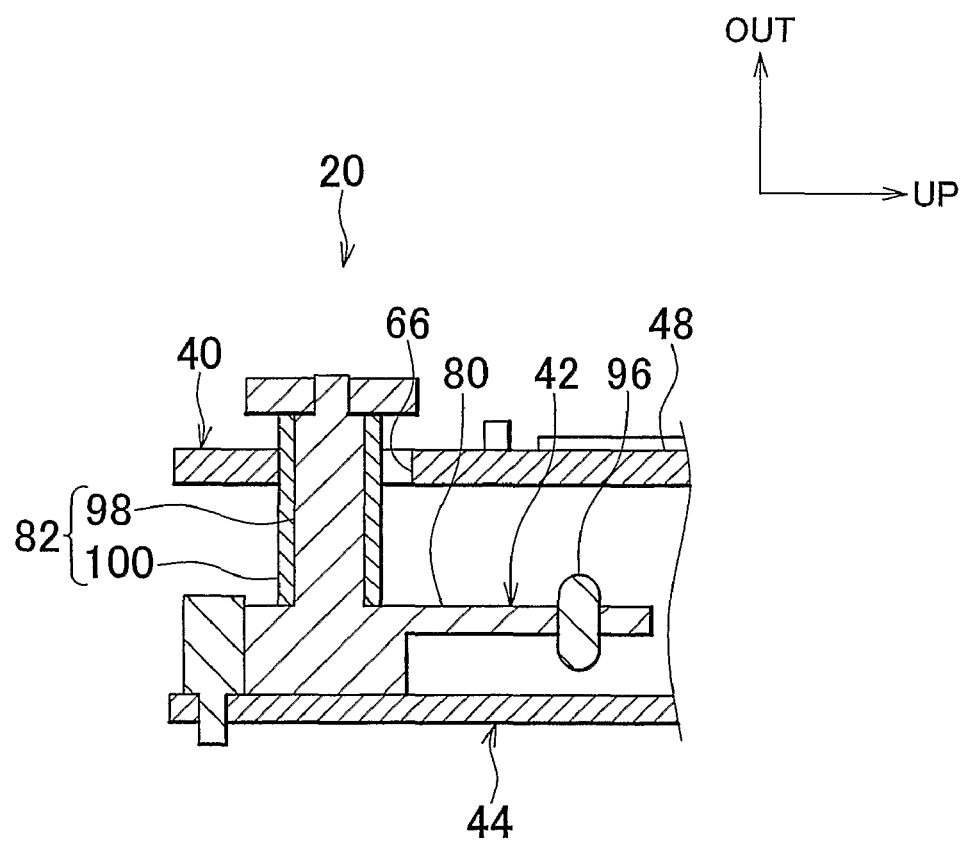
FIG. 9 is a sectional view taken along line IX-IX in FIG. 3.

FIGS. 2 to 9 show this unlocking mechanism 20 in detail. Incidentally and more specifically, FIG. 2 is a perspective view of the unlocking mechanism 20 when the angle at which the operating lever 46 is being pulled up (also referred to as the "pull-up angle") is 0°, and FIG. 3 is a side view of the unlocking mechanism 20 in the same case. Also, FIGS. 4, 5, and 6 are side views of the unlocking mechanism 20 when the pull-up angle of the operating lever 46 is θ1, θ2, and θ3, respectively (θ1<θ2<θ3). Further, FIG. 7 is a sectional view taken along line VII-VII in FIG. 3, FIG. 8 is a sectional view taken along line VIII-VIII in FIG. 3, and FIG. 9 is a sectional view taken along line IX-IX in FIG. 3.

As shown in these drawings, the unlocking mechanism 20 includes a main arm 40, a sub-arm 42, and a base plate 44.

The main arm 40 includes the operating lever 46 (i.e., an unlocking lever) and an arm main body portion 48. The arm main body portion 48 is plate-shaped and has a through-hole 50 formed in it in a suitable position, as shown in FIG. 7. The main arm 40 is pivotally supported with respect to the base plate 44 according to the following structure. That is, while a through-hole 54 in a bracket 52 that is fixed to the base plate 44 is aligned with the through-hole 50 in the arm main body portion 48, a cylindrical collar 56 is fitted into the through-hole 50, a bolt 60 is inserted through the through-holes 50 and 54 and a hole 58 of the collar 56, and a nut 62 is screwed onto the bolt 60.

Also, as shown in FIG. 2, an elongated hole 66 and a pair of circular-arc holes 68 and 70 are formed in positions away from a pivoting portion 64 that is formed by the collar 56, the bolt 60, and the nut 62. The elongated hole 66 includes a straight portion 66A that is formed in a straight line, and a circular-arc portion 66B that is formed in a circular arc shape that is concentric with the pivoting portion 64 of the main arm 40.

Meanwhile, the pair of circular-arc holes 68 and 70 are both formed in a circular-arc shape that is concentric with the pivoting portion 64 of the main arm 40. Also, a moving pin 74 provided on an end portion of a rotation unlocking cable 72 that extends from the rotation locking portion 32 is movably inserted into the circular-arc hole 68. Similarly, a moving pin 78 provided on an end portion of a rotation unlocking cable 76 that extends from the lateral slide locking portion 36 described above is movably inserted into the circular-arc hole 70. This pair of circular-arc holes 68 and 70 forms a timing change mechanism for delaying the timing at which the rotation locking portion 32 and the lateral slide locking portion 36 unlock (i.e., the unlock timing) with respect to the longitudinal slide locking portion 28 by the pair of moving pins 74 and 78, as will be described in detail later.

The sub-arm 42 together with the elongated hole 66 described above forms a cam structure. The sub-arm 42 has an arm main body portion 80 and a roller portion 82. The arm main body portion 80 is shaped like a triangular plate when viewed from the side (i.e., the width direction of the vehicle), and is arranged between the main arm 40 and the base plate 44. Also, as shown in FIG. 8, a through-hole 84 is formed in a suitable position in the arm main body portion 80. The sub-arm 42 is movably supported with respect to the base plate 44 according to the following structure. That is, while a through-hole 86 formed in the base plate 44 is aligned with the through-hole 84 in the arm main body portion 80, a bolt 88 is inserted through these through-holes 84 and 86, and a nut 90 is screwed onto the bolt 88.

Also, as shown in FIGS. 2 and 9, a pivoting pin 96, which is provided on the end portion of a longitudinal slide unlocking cable 94 that extends from the longitudinal slide locking portion 28 described above, is pivotally fixed to the arm main body portion 80 in a position away from a pivoting portion 92 that is formed by the bolt 88 and the nut 90 described above.

Also, the roller portion 82 that is integrally formed with the arm main body portion 80 has a shaft portion 98 that is mounted on the arm main body portion 80 so as to protrude from the surface of the arm main body portion 80, and a roller 100 that is rotatably supported on this shaft portion 98. This roller portion 82 is movably inserted into the elongated hole 66 described above and engages with the edge portion of the elongated hole 66. The roller 100 rolls along the edge portion of the elongated hole 66 as the main arm 40 pivots.

Also, the base plate 44 that pivotally supports this main arm 40 and the sub-arm 42 is integrally fixed to a cushion frame or the like, not shown, arranged inside the seat cushion 22 in FIG. 1, for example. Moreover, as shown in FIG. 1, the operating lever 46 protrudes from the cover member 38 provided on the outer side portion in the vehicle width direction of the seat cushion 22 so as to be operable by a seated occupant.

As shown in FIGS. 3 to 6, each portion of the seat 10 is designed to move in a manner described later according to the angle at which the operating lever 46 is pulled up (i.e., according to the pull-up angle).

Incidentally, in this example embodiment, the longitudinal sliding position adjusting mechanism 14 may be regarded as a first adjustable portion of the invention, and the rotational position adjusting mechanism 16 and the lateral sliding position adjusting mechanism 18 may be regarded as a second adjustable portion of the invention. Also, the main arm 40 may be regarded as an operating member of the invention, and the straight portion 66A may be regarded as a first operating force transmitting portion of the invention. Moreover, the pair of circular-arc holes 68 and 70 may be regarded as a second operating force transmitting portion of the invention, and the circular-arc portion 66B may be regarded as an operational reaction force avoiding portion of the invention. Further, the sub-arm 42 may be regarded as a transmitting member of the invention, the roller portion 82 may be regarded as an engaging portion of the invention, and the elongated hole 66 may be regarded as an engaged portion of the invention. Also, the pull-up angle of the operating lever 46 from 0° to θ3 may be regarded as a predetermined range of the invention, the pull-up angle of the operating lever 46 from 0° to θ1 may be determined as a first range of the invention, and the pull-up angle of the operating lever 46 from θ1 to θ3 may be determined as a second range of the invention.

Next, the operation of the seat 10 according to the first example embodiment of the invention, together with the workings and effects thereof, will be described.

(Locking) With the seat 10 according to the first example embodiment of the invention, when the operating lever 46 is not being operated, i.e., when the pull-up angle of the operating lever 46 is 0°, the roller portion 82 is positioned at the edge portion on the straight portion 66A side of the elongated hole 66 and the moving pins 74 and 78 are positioned in the middle in the length direction of the circular-arc holes 68 and 70, as shown in FIG. 3. In this state, there is no operating force for unlocking acting on the longitudinal slide locking portion 28, the rotation locking portion 32, or the lateral slide locking portion 36, so the longitudinal slide locking portion 28, the rotation locking portion 32, and the lateral slide locking portion 36 are locked by being urged to the locked side by the urging members such as springs or the like, not shown.

(Unlocking longitudinal slide) Meanwhile, as shown in FIG. 4, when an operator pulls up on the operating lever 46 in the direction of arrow A1 so that the pull-up angle changes from 0° to θ1, the roller portion 82 moves relatively from the edge portion on the straight portion 66A side of the elongated hole 66 to the connecting portion of the straight portion 66A and the circular-arc portion 66B, while the elongated hole 66 rolls along the roller 100. Accordingly, the sub-arm 42 pivots in the direction of arrow A2 and the longitudinal slide unlocking cable 94 is pulled in the direction of arrow B1. Then, in this way, the operating force of the main arm 40 is transmitted to the longitudinal slide locking portion 28, thus unlocking the longitudinal slide locking portion 28.

Incidentally, the pair of circular-arc holes 68 and 70 are formed in a circular-arc shape that is concentric with the pivoting portion 64 of the main arm 40. As a result, when the operator pulls up on the operating lever 46 so that the pull-up angle changes from 0° to θ1, the moving pins 74 and 78 run freely from the middle in the lengthwise direction of the circular-arc holes 68 and 70 to the edge portion of one end, respectively, as described above. Accordingly, the operating force is not transmitted from the main arm 40 to the rotation locking portion 32 and the lateral slide locking portion 36 (i.e., the transmission of the operating force is interrupted), so the rotation locking portion 32 and the lateral slide locking portion 36 remain locked.

(Unlocking rotation) As shown in FIG. 5, when the operator pulls up on the operating lever 46 in the direction of arrow A1 so that the pull-up angle changes from θ1 to θ2, the moving pins 74 and 78 move while engaging with the edge portion of one end in the lengthwise direction of the circular-arc holes 68 and 70. As a result, the rotation unlocking cable 72 and the lateral slide unlocking cable 76 are pulled in the directions of arrows B2 and B3, respectively. In this way, the operating force of the main arm 40 is transmitted to the rotation locking portion 32 and the lateral slide locking portion 36, and acts to unlock the rotation locking portion 32. Incidentally, at this stage, the lateral slide locking portion 36 remains locked as before.

Also, as described above, when the operator pulls up on the operating lever 46 so that the pull-up angle changes from θ1 to θ2, the roller 82 runs freely from the connecting portion of the straight portion 66A and the circular-arc portion 66B to the middle in the lengthwise direction of the circular-arc portion 66B, while the edge portion of the elongated hole 66 rolls along the roller 100. The circular-arc portion 66B is formed in a circular-arc shape that is concentric with the pivoting portion 64 of the main arm 40 so no force acts on the sub-arm 42 in the pivotal direction. Therefore, the sub-arm 42 is kept at a fixed pivot angle so the longitudinal slide locking portion 28 remains unlocked. Accordingly, operation reaction force (i.e., the urging force from the urging member such as a spring or the like, not shown) that is transmitted from the longitudinal slide locking portion 28 to the operating lever 46 is kept from increasing.

(Unlocking lateral slide) As shown in FIG. 6, when the operator pulls up on the operating lever 46 in the direction of arrow A1 so that the pull-up angle changes from θ2 to θ3, the lateral slide unlocking cable 76 is pulled even further in the direction of arrow B3, which unlocks the lateral slide locking portion 36.

Also, as described above, when the operator pulls up on the operating lever 46 in the direction of arrow A1 so that the pull-up angle changes from θ2 to θ3, the roller portion 82 runs freely against the circular-arc portion 66B. Accordingly, the operation reaction force (i.e., the urging force from the urging member such as a spring or the like, not shown) that is transmitted from the longitudinal slide locking portion 28 to the operating lever 46 is kept from increasing.

Figure 10:
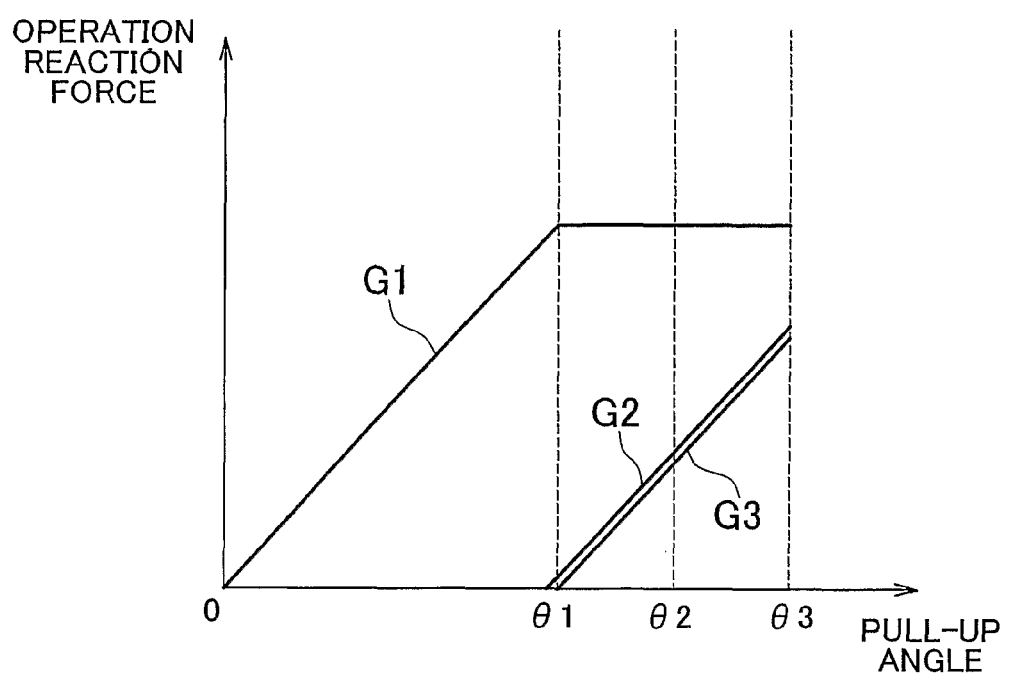
FIG. 10 is a graph showing the relationship between the pull-up angle of an operating lever shown in FIG. 1 and the operation reaction force generated by each locking portion.

Incidentally, FIG. 10 is a graph showing the relationship between the pull-up angle of the operating lever 46 and the operation reaction force generated by each locking portion. In the drawing, graph G1 indicates the operation reaction force generated by the longitudinal slide locking portion 28, graph G2 indicates the operation reaction force generated by the rotation locking portion 32, and graph G3 indicates the operation reaction force generated by the lateral slide locking portion 36.

As shown in the drawing, the operation reaction force generated by the longitudinal slide locking portion 28 increases when the operating lever 46 is pulled up so that the pull-up angle changes from 0° to θ1, but is substantially constant when the operating lever 46 is pulled up so that the pull-up angle changes from θ1 to θ3. On the other hand, the operation reaction force generated by the rotation locking portion 32 and the operation reaction force generated by the lateral slide locking portion 36 are substantially zero when the operating lever 46 is pulled up so that the pull-up angle changes from 0° to θ1, but increase when the operating lever 46 is pulled up so that the pull-up angle changes from θ1 to θ3.

(Operation and effect) As described in detail above, with the seat 10 according to the first example embodiment of the invention, the longitudinal slide locking portion 28, the rotation locking portion 32, and the lateral slide locking portion 36 can all be unlocked by a single operation of the operating lever 46. Therefore, it is possible to prevent an erroneous selection of the operating lever and improve operability of the longitudinal sliding position adjusting mechanism, the rotational position adjusting mechanism, and the lateral sliding position adjusting mechanism, compared with a structure in which an operating lever is provided for each of the longitudinal sliding position adjusting mechanism, the rotational position adjusting mechanism, and the lateral sliding position adjusting mechanism.

Also, with the seat 10 according to the first example embodiment of the invention, the longitudinal slide locking portion 28, the rotation locking portion 32, and the lateral slide locking portion 36 can be unlocked in that order by changing the pull-up angle of the operating lever 46 in stages. That is, the longitudinal slide locking portion 28, the rotation locking portion 32, and the lateral slide locking portion 36 can be unlocked at different timings by a single operation of the operating lever 46.

Here, for example, when the longitudinal slide locking portion 28, the rotation locking portion 32, and the lateral slide locking portion 36 are all unlocked at the same time and the seat main body 12 is slid in the longitudinal direction of the vehicle from force applied to the side portion or the like of the seat main body 12 from outside of the vehicle when an occupant is getting into the vehicle, the seat main body 12 may rotate and slide in the width direction of the vehicle. As a result, the seat main body 12 may be unable to be slid smoothly in the longitudinal direction of the vehicle.

In contrast, with the seat 10 according to the first example embodiment of the invention, it is possible to unlock only the longitudinal slide locking portion 28 while the rotation locking portion 32 and the lateral slid locking portion 36 remain locked, by pulling up on the operating lever 46 so that the pull-up angle is θ1. Accordingly, even if force is applied to the side portion or the like of the seat main body 12 from outside of the vehicle when an occupant is getting into the vehicle, for example, the seat main body 12 can be prevented from rotating or sliding in the vehicle width direction. As a result, the seat main body 12 can be smoothly slid in the longitudinal direction of the vehicle.

In this way, with the seat 10 according to the first example embodiment of the invention, the longitudinal slide locking portion 28, the rotation locking portion 32, and the lateral slide locking portion 36 can be unlocked at different times so the operability of the longitudinal sliding position adjusting mechanism 14, the rotational position adjusting mechanism 16, and the lateral sliding position adjusting mechanism 18 can be further improved.

Moreover, with the seat 10 according to the first example embodiment of the invention, when an operator pulls up on the operating lever 46 so that the pull-up angle changes from θ1 to θ3, the longitudinal slide locking portion 28 remains unlocked, so an increase in the operation reaction force that is transmitted from the longitudinal slide locking portion 28 to the operating lever 46 can be avoided. As a result, the operability of the longitudinal sliding position adjusting mechanism 14, the rotational position adjusting mechanism 16, and the lateral sliding position adjusting mechanism 18 can be further improved compared to when operation reaction force from the longitudinal slide locking portion 28 is increased when the operating lever 46 is pulled up so that the pull-up angle changes from θ1 to θ3.

Also, with the seat 10 according to the first example embodiment of the invention, the elongated hole 66 that forms the cam structure by the straight portion 66A and the circular-arc portion 66B is provided and the straight portion 66A and the circular-arc portion 66B are continuous and integrally formed with the main arm 40. As a result, the operability of the longitudinal sliding position adjusting mechanism 14, the rotational position adjusting mechanism 16, and the lateral sliding position adjusting mechanism 18 can be improved with a simple structure while suppressing an increase in the number of parts.

In particular, the seat 10 according to the first example embodiment employs a simple structure wherein the elongated hole 66, in which the roller portion 82 is movably inserted and with which the roller portion 82 is engaged, is formed in the main arm 40, which enables the cost to be reduced.

Figure 11:
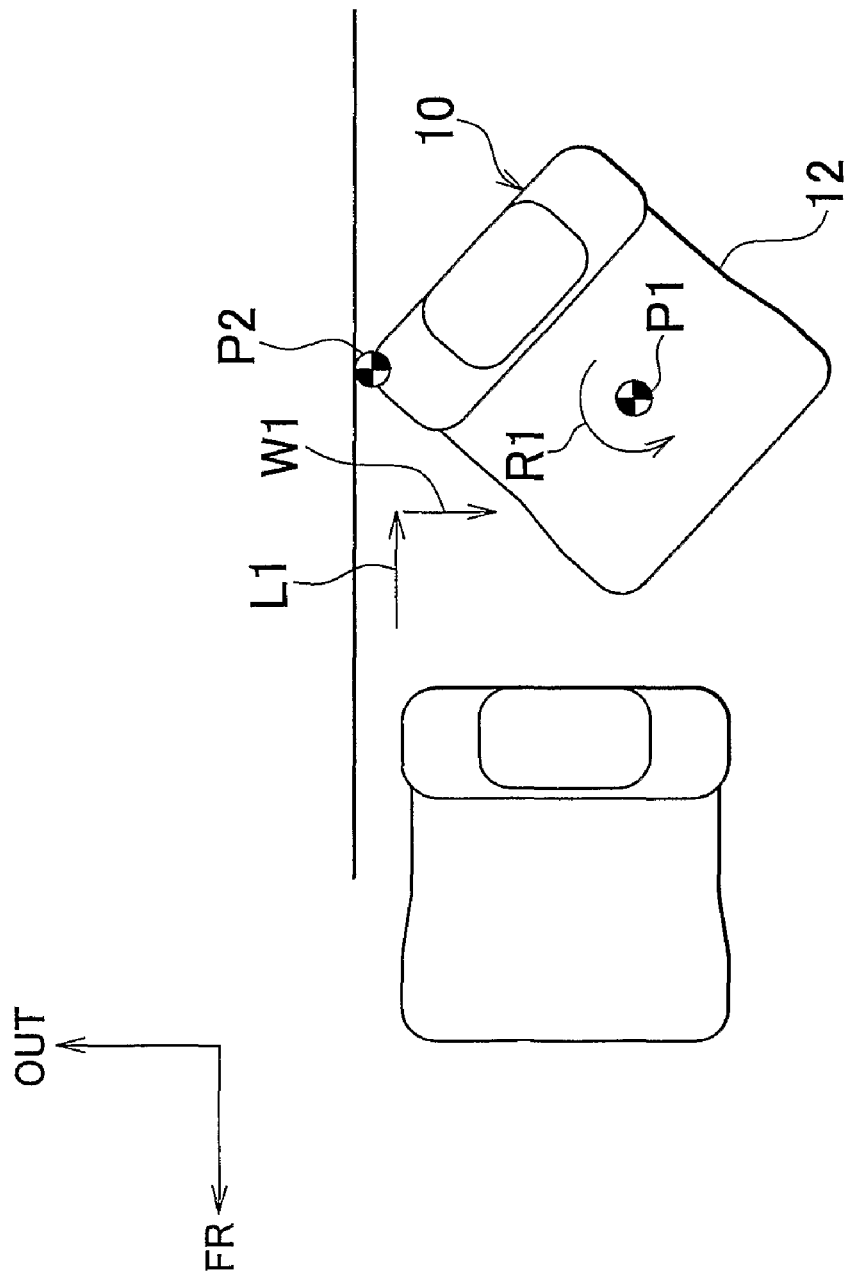
FIG. 11 is a view showing a seat main body shown in FIG. 1 having been slid and pivoted.

Also, with the seat 10 according to the first example embodiment of the invention, the longitudinal slide locking portion 28, the rotation locking portion 32, and the lateral slide locking portion 36 can all be unlocked by pulling up on the operating lever 46 so that the pull-up angle is θ3. Accordingly, for example, the seat main body 12 can be pivoted toward the inside of the vehicle (i.e., in the direction of arrow R1) while being slid backward in the longitudinal direction of the vehicle (i.e., in the direction of arrow L1) and toward the inside in the width direction of the vehicle (i.e., in the direction of arrow W1), as shown in FIG. 11. As a result, the pivotal center P1 which is the center of the seat main body 12 essentially moves to the position of the pivotal center P2 toward the rear in the longitudinal position of the vehicle and toward the outside in the width direction of the vehicle of the seat main body 12, which is the same as it is normally. This inhibits the seat main body 12 from hitting the front seat or door trim or the like, and enables the pivot angle of the seat main body 12 toward the inside of the vehicle to be enlarged.

Also, with the seat 10 according to the first example embodiment of the invention, the stroke of the longitudinal slide locking portion 28 is shorter than the stroke of the operating lever 46, which is also advantageous in cases where a long stroke of the longitudinal slide locking portion 28 is not structurally possible.

While an example embodiment of the invention has been described, the invention is not limited to this example embodiment. That is, the invention can be modified without departing from the scope thereof.

For example, in the example embodiment described above, the seat 10 is formed with the longitudinal sliding position adjusting mechanism 14, the rotation position adjusting mechanism 16, and the lateral sliding position adjusting mechanism 18. Alternatively, for example, the seat 10 may be formed with the longitudinal sliding position adjusting mechanism 14 and the lateral sliding position adjusting mechanism 18, with the longitudinal sliding position adjusting mechanism 14 and the rotation position adjusting mechanism 16, or with the rotation position adjusting mechanism 16 and the lateral sliding position adjusting mechanism 18.

Also, in the example embodiment described above, the rotation locking portion 32 and the lateral slide locking portion 36 are designed to unlock when the operating lever 46 is pulled up so that the pull-up angle changes from θ1 to θ3. Alternatively, however, the rotation locking portion 32 and the lateral slide locking portion 36 may be designed to unlock when the operating lever 46 is pulled up so that the pull-up angle changes from 0° to θ3.

Also, in the example embodiment described above, the longitudinal slide locking portion 28, the rotation locking portion 32, and the lateral slide locking portion 36 are designed to unlock in that order when the operating lever 46 is pulled up so that the pull-up angle changes from 0° to θ3. Alternatively, however, the longitudinal slide locking portion 28, the rotation locking portion 32, and the lateral slide locking portion 36 may be designed to unlock in another order when the operating lever 46 is pulled up so that the pull-up angle changes from 0° to θ3.

Also, in the example embodiment described above, the longitudinal sliding position adjusting mechanism 14, the rotational position adjusting mechanism 16, and the lateral sliding position adjusting mechanism 18 are able to be adjusted (i.e., unlocked) by operating force transmitted from the operating lever 46. Alternatively, however, the position may by able to be adjusted by operating force transmitted from the operating lever 46, like a height position adjusting mechanism (i.e., a lift mechanism), for example.

Also, in the example embodiment described above, the seat 10 is formed with the longitudinal sliding position adjusting mechanism 14 as the first adjustable portion of the invention and the rotational position adjusting mechanism 16 and the lateral sliding position adjusting mechanism 18 as the second adjustable portion of the invention. Alternatively, however, a height position adjusting mechanism or the like for adjusting the position in the height direction of the seat main body 12, for example, may be provided instead of one of those three, i.e., the longitudinal sliding position adjusting mechanism 14, the rotational position adjusting mechanism 16, and the lateral sliding position adjusting mechanism 18.

Figure 12:
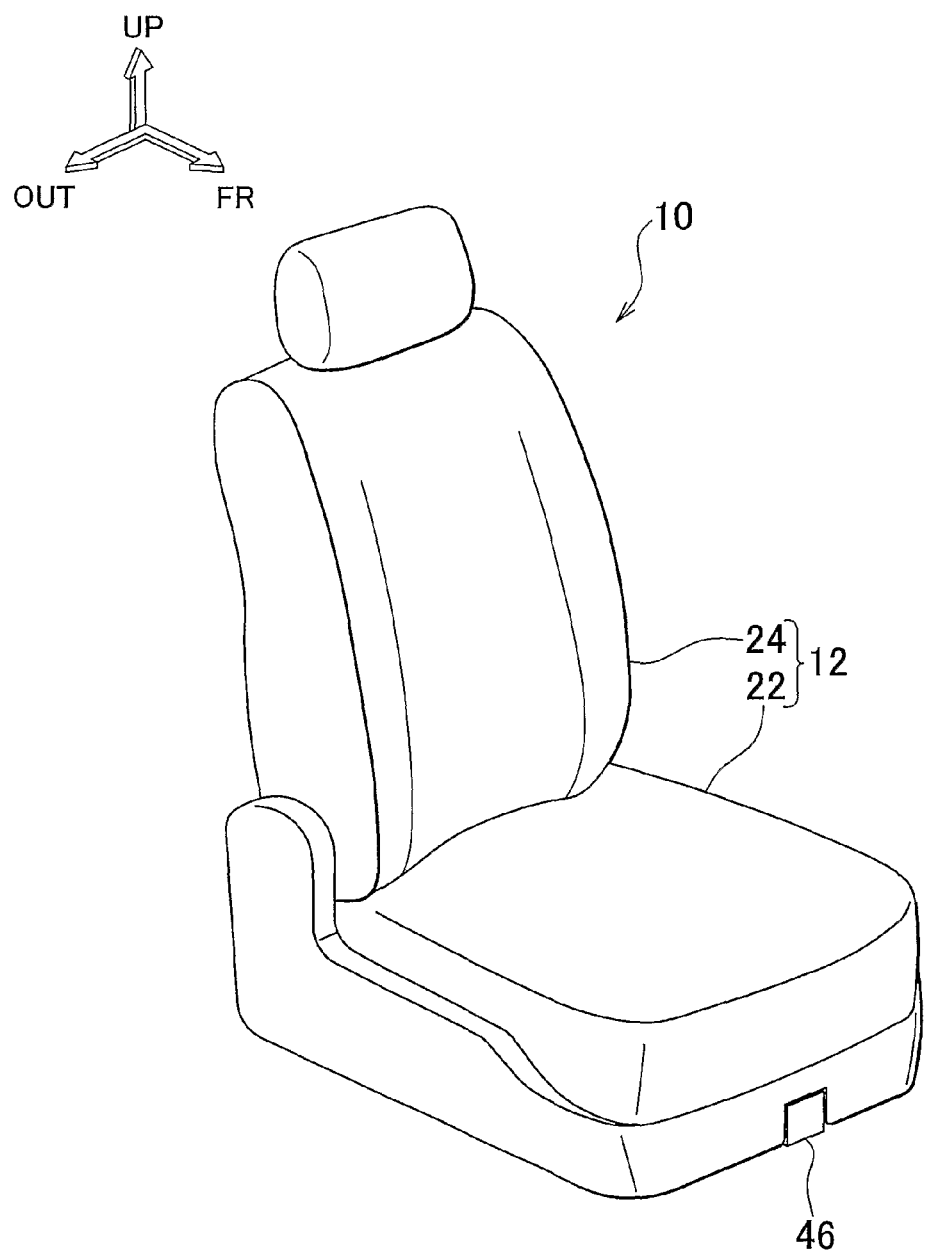
FIG. 12 is a view of a modified example of the seat according to the first example embodiment of the invention.
Figure 13:
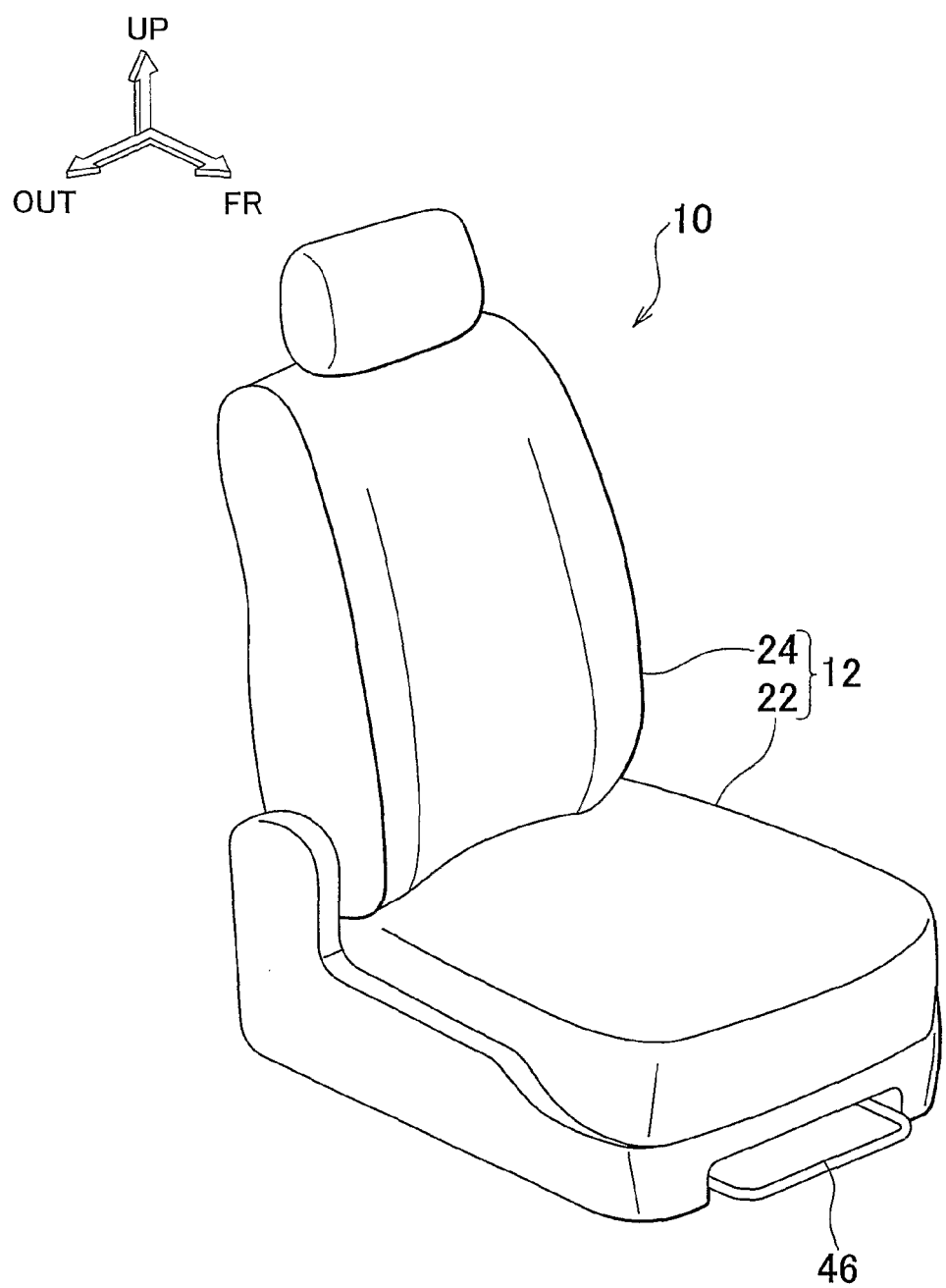
FIG. 13 is a view of another modified example of the seat according to the first example embodiment of the invention.

Also, in the example embodiment described above, the operating lever 46 is a so-called reclining type lever, but it may also be a pull-up type lever as shown in FIG. 12, or a loop handle (i.e., bar) type lever as shown in FIG. 13.

Furthermore, in the example embodiment described above, the operating lever 46 is arranged on an outside portion of the seat cushion 22 in the width direction of the vehicle. Alternatively, for example, the operating lever 46 may be arranged on a side portion on the inside in the width direction of the vehicle of the seat cushion 22, on a lower portion at the front in the longitudinal direction of the vehicle of the seat cushion 22, or on a side portion on the inside or outside in the width direction of the vehicle of the seatback 24.

Also, in the example embodiment described above, the unlocking mechanism 20 is connected in parallel to the longitudinal slide locking portion 28 via the longitudinal slide unlocking cable 94, the rotation locking portion 32 via the rotation unlocking cable 72, and the lateral slide locking portion 36 via the lateral slide unlocking cable 76. Alternatively, however, the unlocking mechanism 20 may be connected in series to the longitudinal slide locking portion 28 via the longitudinal slide unlocking cable 94, the lateral slide locking portion 36 via the lateral slide unlocking cable 76, and the rotation locking portion 32 via the rotation unlocking cable 72, as shown in FIG. 14, for example.

Figure 14:
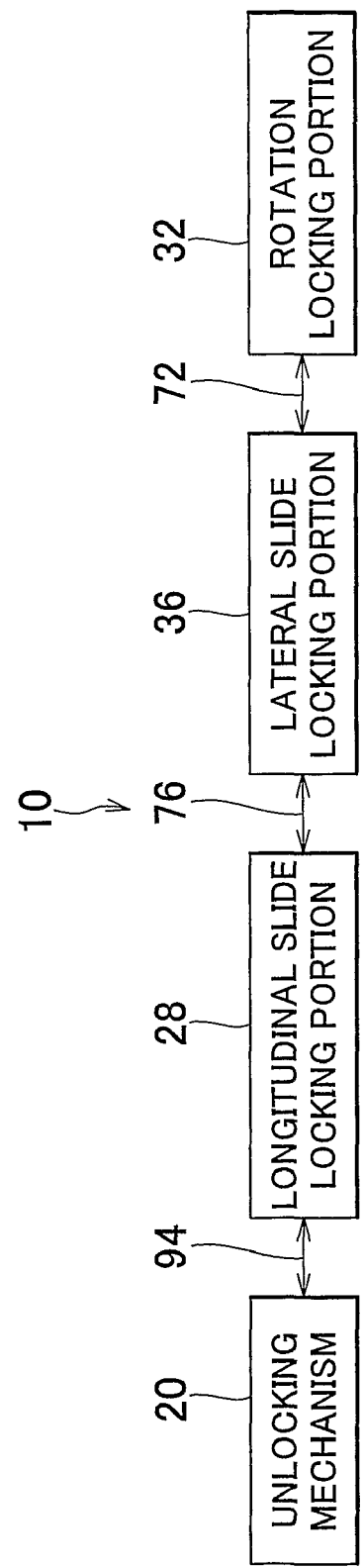
FIG. 14 is a view of yet another modified example of the seat according to the first example embodiment of the invention.

Incidentally, in the structure shown in FIG. 14, a cam structure formed of the sub-arm 42 and the elongated hole 66, and a timing changing mechanism formed of the pair of moving pins 74 and 78 and the pair of circular-arc holes 68 and 70 (or a cam structure and a timing changing mechanism which have the same functions as these) are appropriately provided at the connecting portion between the cables and locking portions or the like, for example. Also, in the structure shown in FIG. 14, the order in which the longitudinal slide locking portion 28, the rotation locking portion 32, and the lateral slide locking portion 36 are arranged may be changed.

Also, in the example embodiment described above, the unlocking mechanism 20 may be structured as described below.

Figure 15:
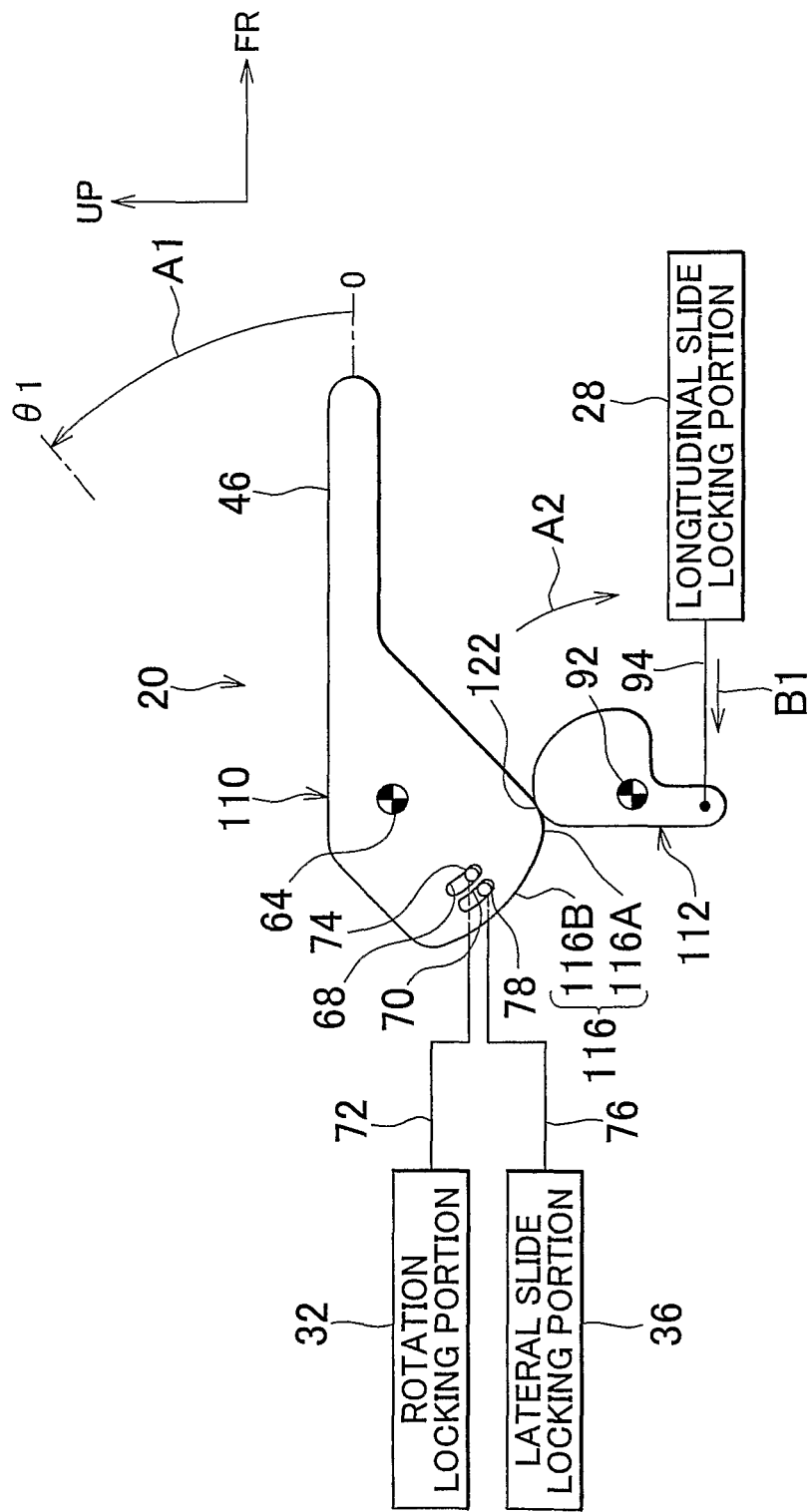
FIG. 15 is a view of a modified example of the unlocking mechanism in the first example embodiment of the invention.
Figure 16:
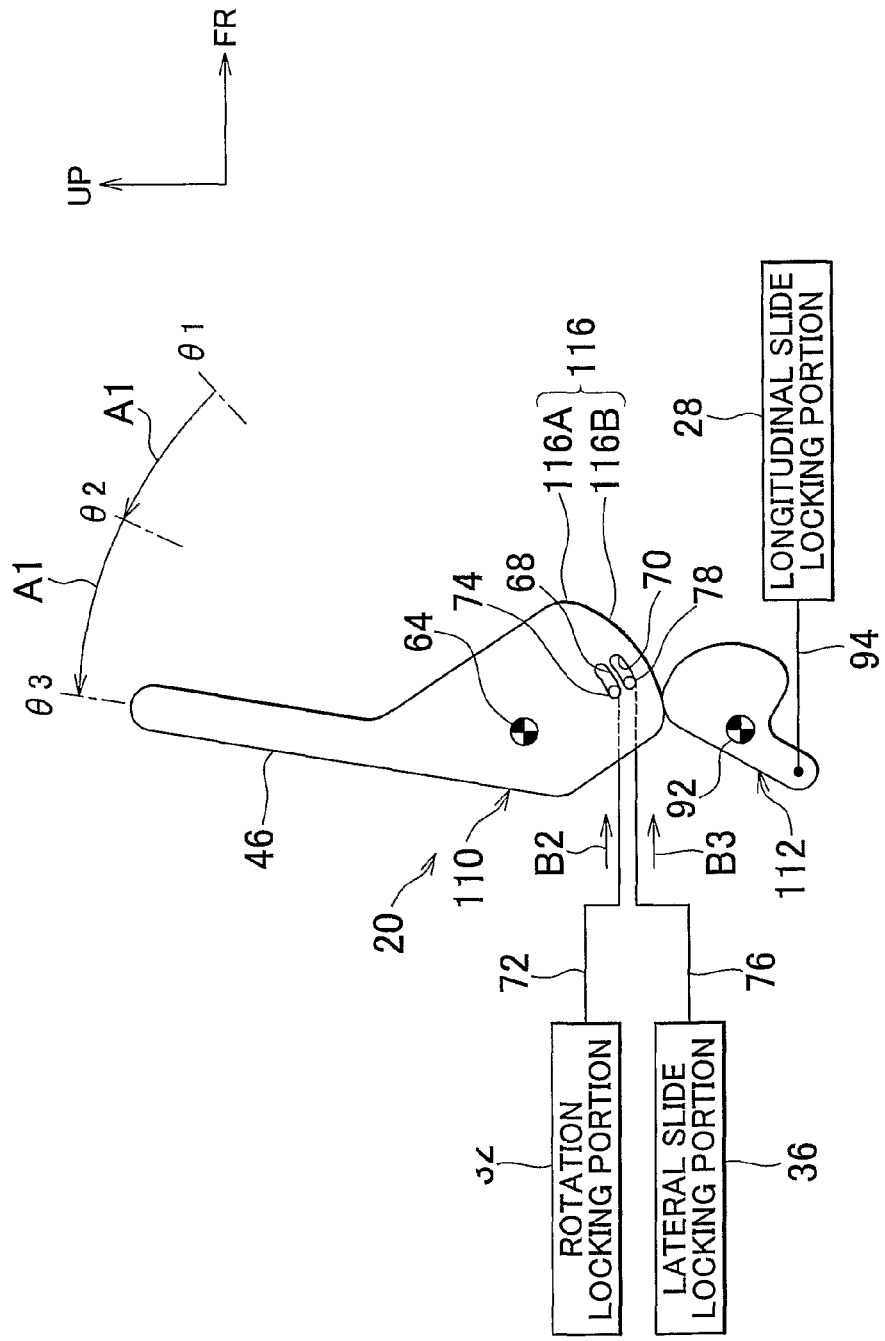
FIG. 16 is an operational diagram of the unlocking mechanism shown in FIG. 15.

That is, in the modified example shown in FIGS. 15 and 16, the unlocking mechanism 20 includes a main arm 110 and a sub-arm 112. The main arm 110 has a contoured portion 116 instead of the elongated hole 66 in the main arm 40 according to the first example embodiment of the invention described above. The rest of the structure of the main arm 110 is the same as it is with the main arm 40 according to the first example embodiment of the invention described above. The contoured portion 116 is formed of a first circular-arc portion 116A that has a predetermined curvature, and a second circular-arc portion 116B formed in a circular-arc shape that is concentric with the pivoting portion 64 of the main arm 110.

The sub-arm 112 together with the contoured portion 116 described above forms a cam structure. This sub-arm 112 is pivotally supported by the seat main body 12 described above: A contoured portion 122 that movably abuts against and engages with the contoured portion 116 is formed on the sub-arm 112. The contoured portion 122 is formed in a circular-arc shape that has a predetermined curvature.

Incidentally, in this modified example, the main arm 110 may be regarded as an operating member of the invention, the first circular-arc portion 116A may be regarded as a first operating force transmitting portion of the invention, and the second circular-arc portion 116B may be regarded as an operation reaction force avoiding portion of the invention. Also, the sub-arm 112 may be regarded as a transmitting member of the invention, the contoured portion 122 of the sub-arm 112 may be regarded as an engaging portion of the invention, and the contoured portion 116 of the main arm 110 may be regarded as an engaged portion of the invention.

In this modified example as well, when the operator pulls up on the operating lever 46 in the direction of arrow A1 so that the pull-up angle changes from 0° to θ1, the contoured portion 122 of the sub-arm 112 moves the first circular-arc portion 116A of the contoured portion 116 of the main arm 110, as shown in FIG. 15. As a result, the sub-arm 112 is moved in the direction of arrow A2 such that the longitudinal slide unlocking cable 94 is pulled in the direction of arrow B1.

In this way, the operating force of the main arm 110 is transmitted to the longitudinal slide locking portion 28, thereby unlocking the longitudinal slide locking portion 28.

Incidentally, at this time, the moving pins 74 and 78 run freely in the circular-arc holes 68 and 70. As a result, the operating force is not transmitted from the main arm 110 to the rotation locking portion 32 and the lateral slide locking portion 36, so the rotation locking portion 32 and the lateral slide locking portion 36 remain locked.

As shown in FIG. 16, when the operator pulls up on the operating lever 46 in the direction of arrow A1 so that the pull-up angle changes from θ1 to θ3, the operating force of the main arm 110 is transmitted to the rotation locking portion 32 and the lateral slide locking portion 36, thereby unlocking the rotation locking portion 32 and the lateral slide locking portion 36 in that order.

Also, when the operator pulls up on the operating lever 46 in the direction of arrow A1 so that the pull-up angle changes from θ1 to θ3, the contoured portion 122 of the sub-arm 112 slidingly contacts the second circular-arc portion 116B. The second circular-arc portion 116B is formed in a circular-arc shape that is concentric with the pivoting portion 64 of the main arm 110 so no force acts on the sub-arm 112 in the pivotal direction. Therefore, the sub-arm 112 is kept at a fixed pivot angle so the longitudinal slide locking portion 28 remains unlocked. Accordingly, operation reaction force (i.e., the urging force from the urging member such as a spring or the like, not shown) that is transmitted from the longitudinal slide locking portion 28 to the operating lever 46 is kept from increasing.

In this way, the same operational effects as those obtained by the first example embodiment of the invention described above are able to be obtained by this structure as well.

Also, in the modified example shown in FIGS. 17 to 20, the unlocking mechanism 20 includes a main arm 130 and a sub-arm 132. The main arm 130 has a contoured portion 136 instead of the elongated hole 66 in the main arm 40 according to the first example embodiment of the invention described above. The rest of the structure of the main arm 130 is the same as it is with the main arm 40 according to the first example embodiment of the invention described above. The contoured portion 136 is formed of a first wall portion 136A that is formed in a straight shape and faces forward in the longitudinal direction of the vehicle, and a second wall portion 136B that is formed in a straight shape and faces the inside in the width direction of the vehicle, while extending in a direction parallel with the tangential direction of the sub-arm 132.

The sub-arm 132 together with the contoured portion 136 described above forms a cam structure. This sub-arm 132 is pivotally supported on the seat main body 12 by a pivoting portion 146 that extends in the vertical direction of the vehicle (i.e., a pivoting portion 146 that is arranged rotated 90° with respect to the pivoting portion 64 of the main arm 130). A contoured portion 142 that movably abuts against and engages with the contoured portion 136 is formed on the sub-arm 132. The contoured portion 142 is formed in a straight shape.

Incidentally, with this modified example, the main arm 130 may be regarded as an operating member of the invention, the first wall portion 136A may be regarded as a first operating force transmitting portion of the invention, and the second wall portion 136B may be regarded as an operation reaction force avoiding portion of the invention. Also, the sub-arm 132 may be regarded as a transmitting member of the invention, the contoured portion 142 of the sub-arm 132 may be regarded as an engaging portion of the invention, and the contoured portion 136 of the main arm 130 may be regarded as an engaged portion of the invention.

Figure 17:
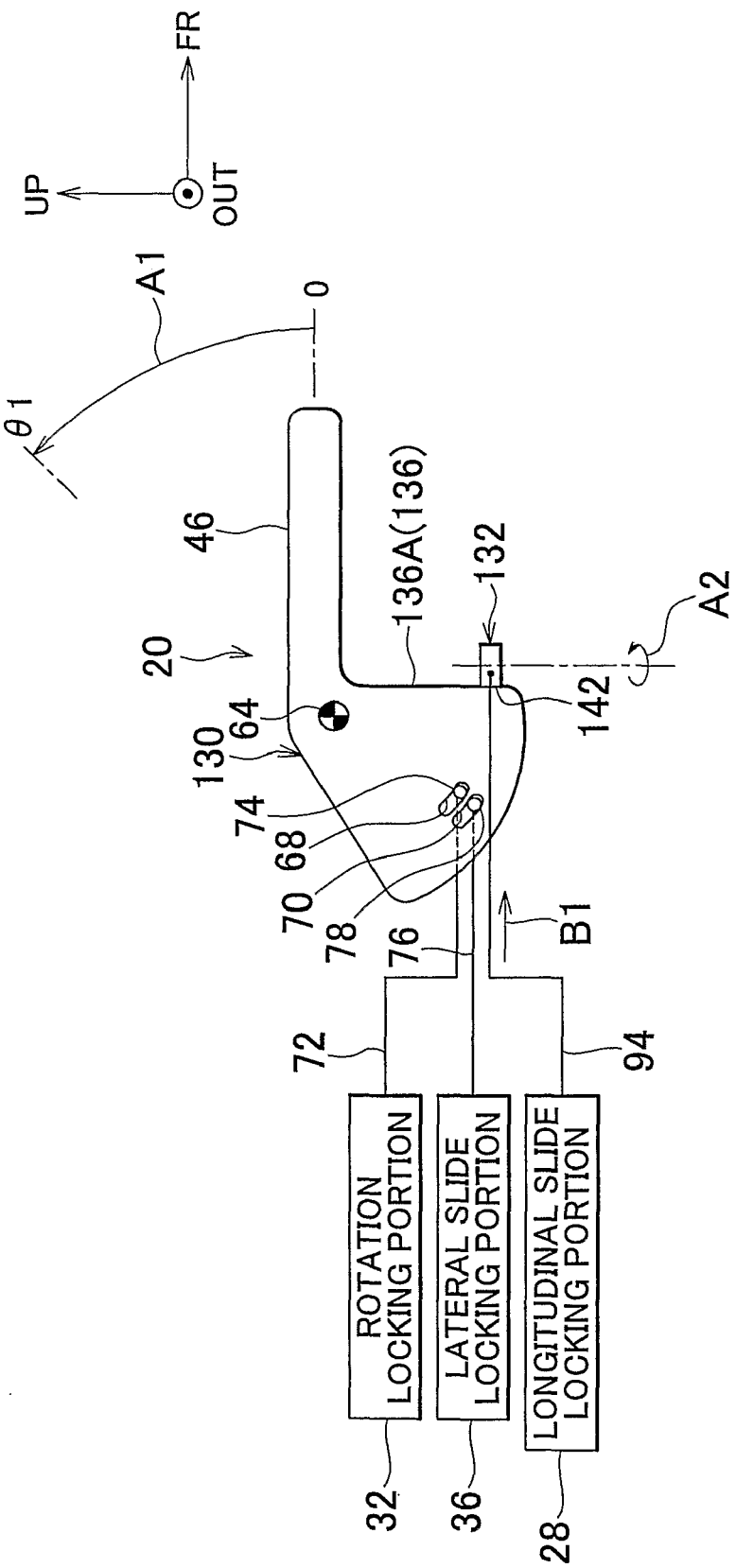
FIG. 17 is a view of another modified example of the unlocking mechanism in the first example embodiment of the invention.
Figure 18:
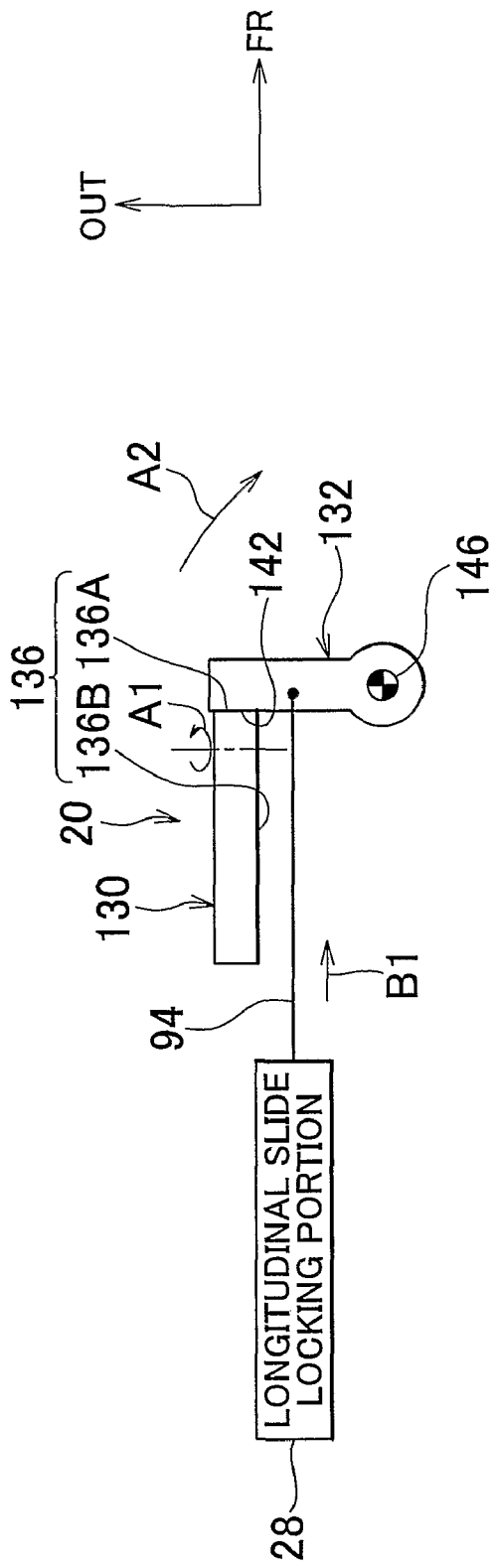
FIG. 18 is a bottom view of the unlocking mechanism shown in FIG. 17.

In this modified example as well, when the operator pulls up on the operating lever 46 in the direction of arrow A1 so that the pull-up angle changes from 0° to θ1, the contoured portion 142 of the sub-arm 132 moves the first wall portion 136A of the contoured portion 136 of the main arm 130 through sliding contact with that first wall portion 136A, as shown in FIGS. 17 and 18. As a result, the sub-arm 132 is moved in the direction of arrow A2 such that the longitudinal slide unlocking cable 94 is pulled in the direction of arrow B1. In this way, the operating force of the main arm 130 is transmitted to the longitudinal slide locking portion 28, thereby unlocking the longitudinal slide locking portion 28.

Incidentally, at this time, the moving pins 74 and 78 run freely in the circular-arc holes 68 and 70. As a result, the operating force is not transmitted from the main arm 130 to the rotation locking portion 32 and the lateral slide locking portion 36, so the rotation locking portion 32 and the lateral slide locking portion 36 remain locked.

Figure 19:
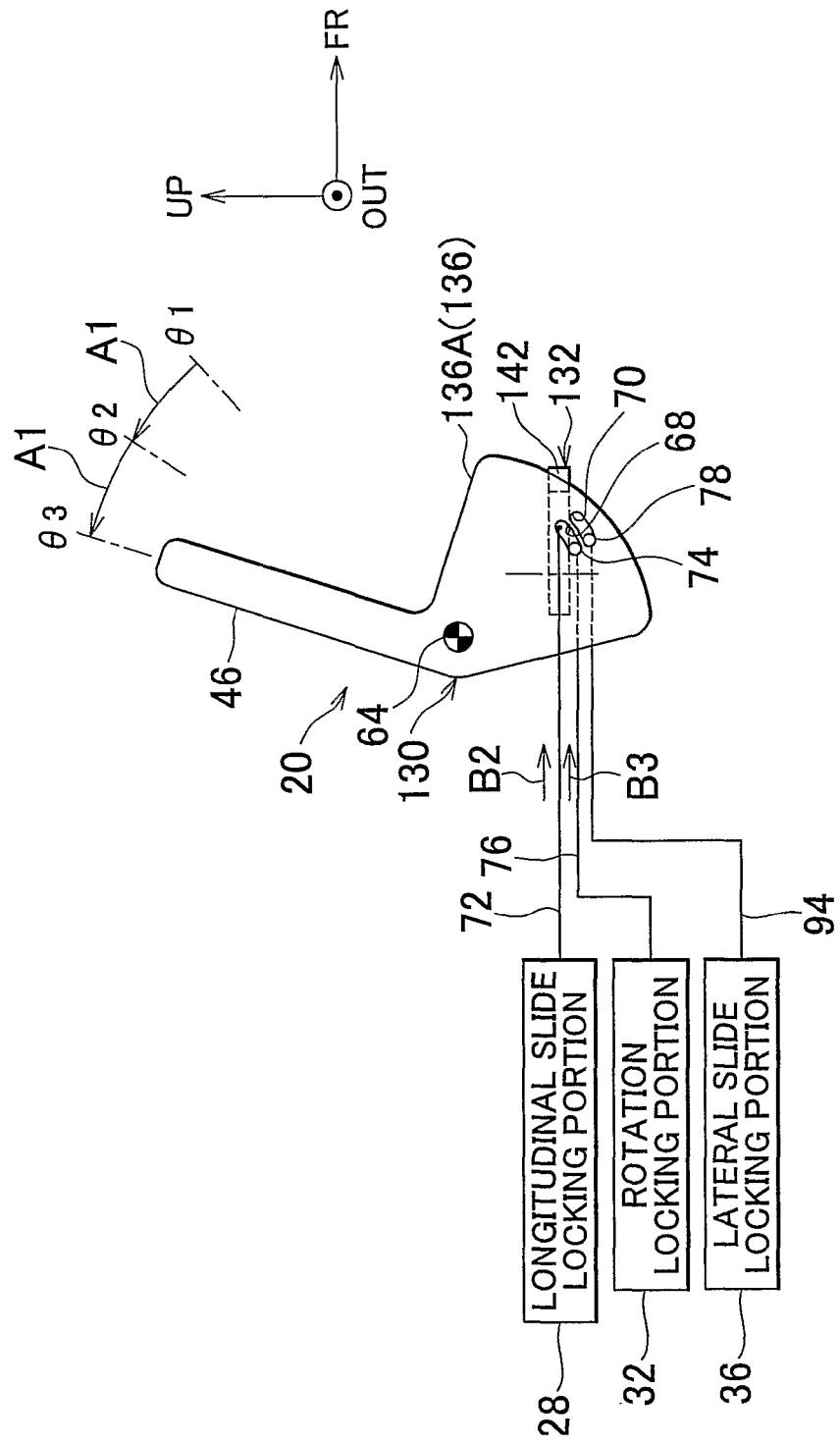
FIG. 19 is an operational diagram of the unlocking mechanism shown in FIG. 17.
Figure 20:
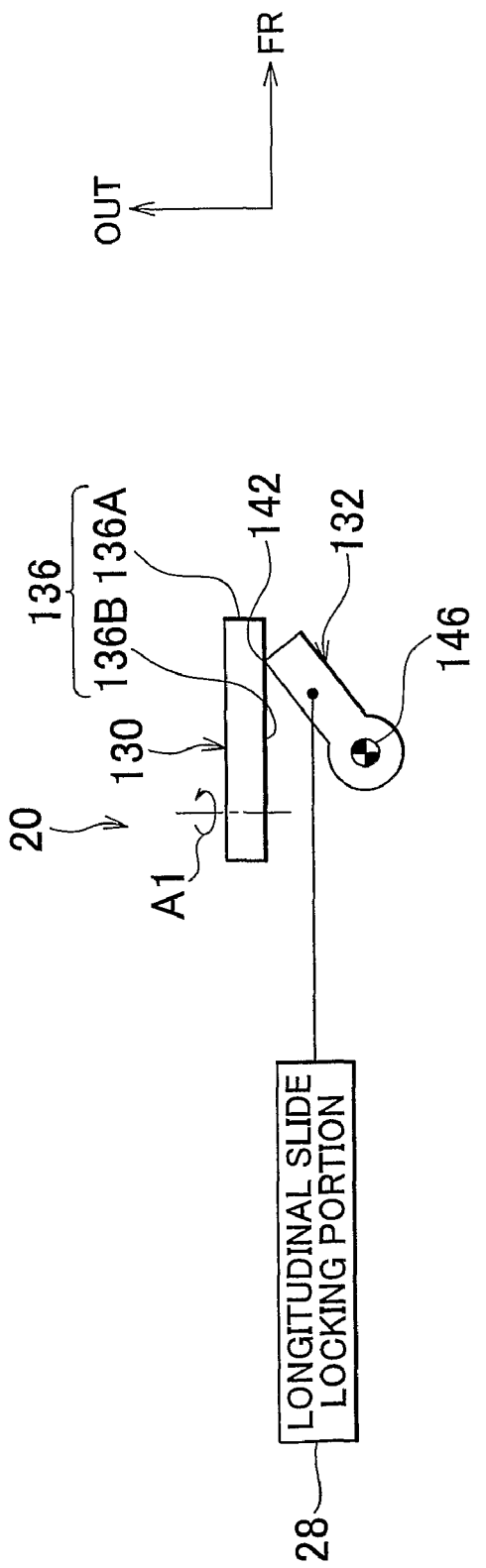
FIG. 20 is a bottom view of the unlocking mechanism shown in FIG. 19.

As shown in FIGS. 19 and 20, when the operator pulls up on the operating lever 46 in the direction of arrow A1 so that the pull-up angle changes from θ1 to θ3, the operating force of the main arm 130 is transmitted to the rotation locking portion 32 and the lateral slide locking portion 36, thereby unlocking the rotation locking portion 32 and the lateral slide locking portion 36 in that order.

Also, when the operator pulls up on the operating lever 46 so that the pull-up angle changes from θ1 to θ3, the contoured portion 142 of the sub-arm 132 slidingly contacts the second wall portion 136B. The second wall portion 136B is formed in a straight shape extending in a direction parallel with the tangential direction of the sub-arm 132. Therefore, the sub-arm 132 is kept at a fixed pivot angle so the longitudinal slide locking portion 28 remains unlocked. Accordingly, operation reaction force (i.e., the urging force from the urging member such as a spring or the like, not shown) that is transmitted from the longitudinal slide locking portion 28 to the operating lever 46 is kept from increasing.

In this way, the same operational effects as those obtained by the first example embodiment of the invention described above are able to be obtained by this structure as well.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A seat comprising:
   a seat main body for seating an occupant;
   a first adjustable portion and a second adjustable portion, each of which is provided on the seat main body and is adjusted or placed in an adjustable state by an operating force that is transmitted;
   an operating member which is displaced in a predetermined range by an input operating force from an operation performed by an operator;
   a first operating force transmitting portion for transmitting the operating force from the operating member to the first adjustable portion when the operating member is displaced in a first range within the predetermined range by the input operating force;
   a second operating force transmitting portion for transmitting the operating force from the operating member to the second adjustable portion when the operating member is displaced in a range that at least includes a second range that differs from the first range within the predetermined range by the input operating force; and
   an operation reaction force avoiding portion for avoiding an increase in operation reaction force transmitted from the first adjustable portion to the operating member by keeping the first adjustable portion in the state that the first adjustable portion is in when the operating member is displaced in the first range, when the operating member is displaced in the second range after having been displaced in the first range, by the input operating force.

2. The seat according to claim 1, wherein the second operating force transmitting portion is formed to interrupt the transmission of operating force from the operating member to the second adjustable portion when the operating member is displaced in the first range by the input operating force, and transmit the operating force of the operating member to the second adjustable portion when the operating member is displaced in the second range by the input operating force.

3. The seat according to claim 1, further comprising:
   a transmitting member which is formed with an engaging portion and which is able to transmit operating force to the first adjustable portion and is displaceably provided with respect to the seat main body,
   wherein the first operating force transmitting portion and the operation reaction force avoiding portion are continuous and integrally formed with the operating member, and together form an engaged portion that engages with the engaging portion such that operating force of the operating member can be transmitted.

4. The seat according to claim 3, wherein the engaged portion is an elongated hole in the operating member into which the engaging portion is movably inserted and with which the engaging portion is engaged.

5. The seat according to claim 3, wherein the engaged portion is a contoured portion of the operating member against which the engaging portion is movably abutted and with which the engaging portion is engaged.

6. The seat according to claim 4, wherein the operating member and the transmitting member are each pivotally provided on the seat main body, and a portion of the engaged portion that is formed by the operation reaction force avoiding portion is formed in a circular-arc shape that is concentric with the pivoting portion of the operating member.

7. The seat according to claim 5, wherein the operating member and the transmitting member are each pivotally provided on the seat main body, and a portion of the engaged portion that is formed by the operation reaction force avoiding portion is formed in a straight shape extending in a direction parallel with the tangential direction of the transmitting member.

8. The seat according to claim 1, wherein the first adjustable portion and the second adjustable portion are a combination of at least two from among i) a longitudinal sliding position adjusting mechanism for adjusting the sliding position of the seat main body in the longitudinal direction, ii) a rotational position adjusting mechanism for adjusting the position of the seat main body in the rotational direction, and iii) a lateral sliding position adjusting mechanism for adjusting the sliding position of the seat main body in the lateral direction.

* * * * *